US012718106B2

(12) United States Patent
Cser et al.

(10) Patent No.: US 12,718,106 B2
(45) Date of Patent: Aug. 25, 2026

(54) SOFTWARE TEST CASE MAINTENANCE

(71) Applicant: Functionize, Inc., Walnut Creek, CA (US)

(72) Inventors: Tamas Cser, San Francisco, CA (US); Jonathon R. Seaton, San Francisco, CA (US)

(73) Assignee: Functionize, Inc., San Francisco, CA (US)

( * ) Notice: Subject to any disclaimer, the term of this patent is extended or adjusted under 35 U.S.C. 154(b) by 19 days.

(21) Appl. No.: 18/387,269

(22) Filed: Nov. 6, 2023

(65) Prior Publication Data

US 2024/0177007 A1 May 30, 2024

Related U.S. Application Data

(63) Continuation of application No. 17/287,732, filed as application No. PCT/US2019/057738 on Oct. 23, 2019, now abandoned.

(60) Provisional application No. 62/749,521, filed on Oct. 23, 2018.

(51) Int. Cl.

| | |
|---|---|
| ***G06F 9/44*** | (2018.01) |
| ***G06F 11/3668*** | (2025.01) |
| ***G06N 3/08*** | (2023.01) |
| ***G06N 3/084*** | (2023.01) |
| ***G06V 10/82*** | (2022.01) |
| ***G06V 10/84*** | (2022.01) |
| ***G06V 20/62*** | (2022.01) |
| ***G06V 30/19*** | (2022.01) |
| *G06F 40/20* | (2020.01) |
| *G06Q 30/0601* | (2023.01) |
| *G06V 30/10* | (2022.01) |

(52) U.S. Cl.
CPC ......... *G06N 3/084* (2013.01); *G06F 11/3688* (2013.01); *G06F 11/3692* (2013.01); *G06N 3/08* (2013.01); *G06V 10/82* (2022.01); *G06V 10/84* (2022.01); *G06V 20/635* (2022.01); *G06V 30/19173* (2022.01); *G06F 40/20* (2020.01); *G06Q 30/0641* (2013.01); *G06V 30/10* (2022.01)

(58) Field of Classification Search
CPC .. G06F 11/3688; G06F 11/3692; G06F 40/20; G06N 3/08
See application file for complete search history.

(56) References Cited

U.S. PATENT DOCUMENTS

| | | | | |
|---|---|---|---|---|
| 2008/0133472 | A1* | 6/2008 | Patterson | G06F 11/368 |
| 2008/0162449 | A1 | 7/2008 | Chao-Yu et al. | |
| 2012/0311471 | A1* | 12/2012 | Bullard | G06F 3/048 715/764 |
| 2013/0159890 | A1 | 6/2013 | Rossi | |
| 2013/0191812 | A1 | 7/2013 | Mishra et al. | |

(Continued)

OTHER PUBLICATIONS

International Search Report and Written Opinion for PCT/US19/57738. Mailed Jan. 15, 2020. 16 pages.

(Continued)

*Primary Examiner* — Hang Pan
(74) *Attorney, Agent, or Firm* — Brian F. Russell

(57) ABSTRACT

Provided herein is technology relating to selecting an element in a software application and particularly, but not exclusively, to systems and methods for identifying a target element for testing a software application using artificial intelligence.

23 Claims, 20 Drawing Sheets

(56) References Cited

U.S. PATENT DOCUMENTS

| | | | |
|---|---|---|---|
| 2018/0011780 A1 | 1/2018 | Aggarwal et al. | |
| 2018/0189170 A1* | 7/2018 | Dwarakanath | G06V 30/153 |
| 2018/0190284 A1* | 7/2018 | Singh | G10L 17/02 |
| 2018/0349730 A1* | 12/2018 | Dixon | G06F 3/0486 |
| 2019/0250891 A1* | 8/2019 | Kumar | G06T 7/70 |

OTHER PUBLICATIONS

Extended European Search Report for PCT/US2019/057738. Mailed Jun. 27, 2022. 11 pages.

Baek (2019) “Character Region Awareness for Text Detection” arXiv:1904.01941 [cs.CV] 12 pages.

Baum (1966) “Statistical Inference for Probabilistic Functions of Finite State Markov Chains” The Annals of Mathematical Statistics 37: 1554-63.

Baum (1967) “An inequality with applications to statistical estimation for probabilistic functions of Markov processes and to a model for ecology” Bulletin of the American Mathematical Society 73: 360. 4 pages.

Baum (1968) “Growth transformations for functions on manifolds” Pacific Journal of Mathematics 27: 211-27.

Baum (1970) “A Maximization Technique Occurring in the Statistical Analysis of Probabilistic Functions of Markov Chains” The Annals of Mathematical Statistics 41: 164-71.

Baum (1972) “An Inequality and Associated Maximization Technique in Statistical Estimation of Probabilistic Functions of a Markov Process” Inequalities 3: 1-8.

Bishop (2006) “Pattern Recognition and Machine Learning”, Springer. TOC only. 10 pages.

Duda et al. (2001) “Pattern classification (2nd edition)”, Wiley, New York; TOC only. 12 pages.

Jebara (2004) “Machine Learning: Discriminative and Generative”, The Springer International Series in Engineering and Computer Science (Springer US) TOC only. 9 pages.

Kindermann (1980) “Markov Random Fields and Their Applications”, Contemporary Mathematics, 1. American Mathematical Society, Providence, R.I. 147 pages.

Kingma (2014) “Adam: A Method for Stochastic Optimization” arXiv:1412.6980v1 [cs.LG]. 9 pages.

Kingma (2017) “Adam: A Method for Stochastic Optimization” version 9arXiv:1412.6980v9 [cs.LG]. 15 pages.

Lauritzen et al., (1996) “Graphical models”, Oxford, Clarendon Press, p. 33 et seq. 7 pages.

Lavelli (2004) “Distributional Term Representations: An Experimental Comparison” in Proceedings of the Thirteenth ACM International Conference on Information and Knowledge Management, Association for Computing Machinery, New York, New York. pp. 615-624.

Li (2009) “Markov Random Field Modeling in Image Analysis.” Springer, 3rd ed. (editor Sameer Singh) TOC only. 7 pages.

Mikolov (2013) “Distributed Representations of Words and Phrases and their Compositionality” arXiv:1310.4546 [cs.CL]. 9 pages.

Pennington et al. (2014) “GloVe: Global Vectors for Word Representation”. Proceedings of the 2014 Conference on Empirical Methods in Natural Language Processing, pp. 1532-1543.

Redmon (2015) “You Only Look Once: Unified, Real-Time Object Detection” arXiv:1506.02640 [cs.CV] pp. 779-788.

Redmon (2016) “YOLO9000: Better, Faster, Stronger” arXiv:1612.08242 [cs.CV] pp. 7263-7271.

Redmon (2018) “YOLOv3: An Incremental Improvement” arXiv:1804.02767 [cs.CV], pp. 1-6.

Ronneberger (2015) “U-Net: Convolutional Networks for Biomedical Image Segmentation” arXiv:1505.04597 [cs.CV] pp. 234-241.

Roweis et al., (2000) “Nonlinear dimensionality reduction by locally linear embedding” Science 290: 2323-26.

Simonyan (2018) “Very Deep Convolutional Networks for Large-Scale Image Recognition” arXiv:1409.1556 [cs.CV] pp. 1-14.

Office Action for CA 3117333, mailed Sep. 13, 2023, 6 pages.

* cited by examiner

Estimated number of clusters: 3

FIG. 7

SOFTWARE TEST CASE MAINTENANCE

This application is a continuation of U.S. patent application Ser. No. 17/287,732, filed Apr. 22, 2021, which is a national phase application filed under 35 U.S.C. § 371 of PCT International Application No. PCT/US2019/057738, filed Oct. 23, 2019, which claims the benefit of to U.S. Provisional Patent App. No. 62/749,521, filed Oct. 23, 2018, the entire contents of each of which are incorporated herein by reference for all purposes.

FIELD

Provided herein is technology relating to maintaining software test cases comprising performing actions on elements in a software application and particularly, but not exclusively, to systems and methods for identifying elements in a software application using artificial intelligence.

BACKGROUND

Web application software tests often fail due to a movement or change in one or more attributes and/or attribute values of an element. For example, minor CSS styling changes can cause tests to fail to select a correct element even when no other functionality has changed. In addition, the increasing use of responsive applications (e.g., where the screen layout dynamically changes) requires selectors to be frequently recoded. Accordingly, new technologies for element identification and tracking are needed for maintenance of test cases.

SUMMARY

Accordingly, provided herein is a technology that uses machine learning to identify elements of a software application by inspecting elements on a software application UI (e.g., a web application UI (e.g., a web page)), recording the attributes and/or attribute values of the elements, producing an element definition using element attributes and/or attribute values, and scoring elements by comparing the element definition to the attributes and/or attribute values of a target element of a test case. In some embodiments, scoring elements comprises calculating probabilities (e.g., an element match score) that an element on a software application UI is a target element of a test case, e.g., an element on which a scripted action of a test case acts. As described herein. in some embodiments, the element definition is produced using one or more element attributes and/or attribute values, which can be any properties of an element and/or context attributes and/or attribute values of an element based on the relationship of an element with other elements on the UI. In some embodiments, the technology determines element attributes and/or attribute values that are element visual render, element text, element code, and/or element context. In some embodiments, the technology comprises use of machine learning (e.g., probabilistic models, neural nets, etc.) to improve identifying a target element using element definitions based on element attributes and/or attribute values such as, e.g., element visual render, element text, element code, and/or element context. In some embodiments, computer vision and/or image analysis is used to analyze a software application UI (e.g., a screen shot of a UI), identify elements of the UI, and determine attributes and/or attribute values of elements by analyzing the visual render of elements on the UI. In some embodiments, text extraction, optical character recognition, and/or text embedding is used to analyze a software application UI and determine text attributes and/or attribute values of elements of the UI. In some embodiments, code analysis is used to analyze code that produces elements to determine attributes and/or attribute values of elements of the UI.

In some embodiments, relative position between elements and/or distribution of element attribute values are used to determine the context of an element. For instance, in some embodiments, a model is produced comprising associations between an element and other elements based on attributes and/or attribute values of the elements and relative location on a UI (e.g., a page). Accordingly, embodiments of the technology provide a robust element identification model to track and/or identify elements from one version of software to another version of the software. In some embodiments, the element identification model is used by a selector to identify elements on a page after an element attribute changes, e.g., after an element is moved and/or restyled. In some embodiments, the element identification model is used to identify a target element of a test case and/or a step of a test case.

In some embodiments, the technology provides an autonomous technology for selection of elements on a web application using a combination of a generative model and a discriminative model to produce element definitions. See, e.g., FIG. 1. For example, in some embodiments, an element is identified on a UI and the attributes and/or attribute values of the element are recorded. Next, element attributes and/or attribute values are input into a generative model that outputs a model of the joint probability distribution of element attribute values and selectors defining element classes. Then, elements surrounding the element on the page and/or the attributes and/or attribute values of the elements surrounding the element on the page are used as inputs to train a discriminative model that assigns a probabilistic association of elements and/or element attributes and/or attribute values to selectors defining element classes. Finally, a linear combination of the generative model and the discriminative model is produced and the page contents are used as input into the linear combination to produce a unique element definition of the element. In some embodiments, this process is repeated for each element on a page (e.g., to produce a plurality of element signatures and/or to produce a page signature). In some embodiments, the unique signature of the element and/or the page signature is used to identify a target element by producing match scores describing the likelihood that the element is a target element of a test case. In some embodiments, the unique signature of the element and/or the page signature is used to identify a target element on subsequent visits to the application page.

Accordingly, embodiments of the technology provide method for identifying an element of a user interface that is a target element of a test case action. For example, in some embodiments, methods comprise producing element definitions for elements of a user interface; producing element match scores for the elements by comparing each element definition to a target element definition; and identifying the element having the highest element match score as the target element. In some embodiments, the element having the highest element match score is identified as a putative target element. In some embodiments, producing the element definitions comprises determining attribute values of each element. In some embodiments, determining attribute values comprises evaluating one or more of the element visual render, the element text, the element code, and/or the element context. In some embodiments, methods comprise performing a test case action on the putative target element or target element. In some embodiments, methods comprise validating the result of performing the test case action on the target element or putative target element. In some embodiment, validating the result comprises producing a "test success" or "test failure" value. In some embodiments, the "test success" or "test failure" value is used to train a neural net for identifying target elements. In some embodiments, methods comprise validating page loading prior to producing element definitions for elements of the user interface, e.g., using a timing model. In some embodiments, methods comprise alerting a user of a failed test when validating the result comprises producing a "test failure" value. In some embodiments, methods comprise determining test case intent comprising an intended target and an intended action. In some embodiments, determining test case intent comprises use of natural language processing. In some embodiments, methods comprise comparing the element having the highest element match score and the intended target. In some embodiments, methods comprise performing the intended action on the intended target. In some embodiments, methods comprise producing element match scores using a neural net. In some embodiments, evaluating one or more of the element visual render, the element text, the element code, and/or the element context comprises element visual scoring, element language scoring, element code scoring, and/or element context scoring using a neural net. In some embodiments, evaluating element context comprises producing a linear combination of a generative model and a discriminative model. In some embodiments, evaluating element context comprises relative location of elements, element attributes weighted by stability scores, and/or high information elements.

Further embodiments provide systems for identifying an element of a user interface that is a target element of a test case action. In some embodiments, systems comprise a component configured to produce element definitions for elements of a user interface; a component configured to produce element match scores for the elements by comparing each element definition to a target element definition; and a component configured to identify the element having the highest element match score as the target element. In some embodiments, the component configured to produce element definitions is configured to determine attribute values of each element. In some embodiments, the component configured to determine attribute values is configured to evaluate one or more of the element visual render, the element text, the element code, and/or the element context. In some embodiments, systems further comprise a component configured to perform a test case action on the target element. In some embodiments, systems further comprise a component configured to validate the result of performing the test case action on the target element. In some embodiments, the component configured to validate the result of performing the test case action on the target element is configured to produce a "test success" or "test failure" value. In some embodiments, the "test success" or "test failure" value is used to train a neural net for identifying target elements. In some embodiments, systems further comprise a component configured to validate page loading prior to producing element definitions for elements of the user interface. In some embodiments, the component configured to validate page loading comprises a timing model as described herein. In some embodiments, systems further comprise a component configured to alert a user of a failed test when validating the result comprises producing a "test failure" value. In some embodiments, systems further comprise a component configured to determine test case intent comprising an intended target and an intended action. In some embodiments, the component configured to determine test case intent is configured to use natural language processing. In some embodiments, the systems comprise a neural net. In some embodiments, the component configured to determine attribute values is configured to perform element visual scoring, element language scoring, element code scoring, and/or element context scoring using a neural net. In some embodiments, the component configured to perform element context scoring is configured to produce a linear combination of a generative model and a discriminative model. In some embodiments, the component configured to perform element context scoring is configured to determine relative location of elements, element attributes weighted by stability scores, and/or high information elements.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 7 shows the output of a density-based clustering technology as a graphical plot.

Figure 1:
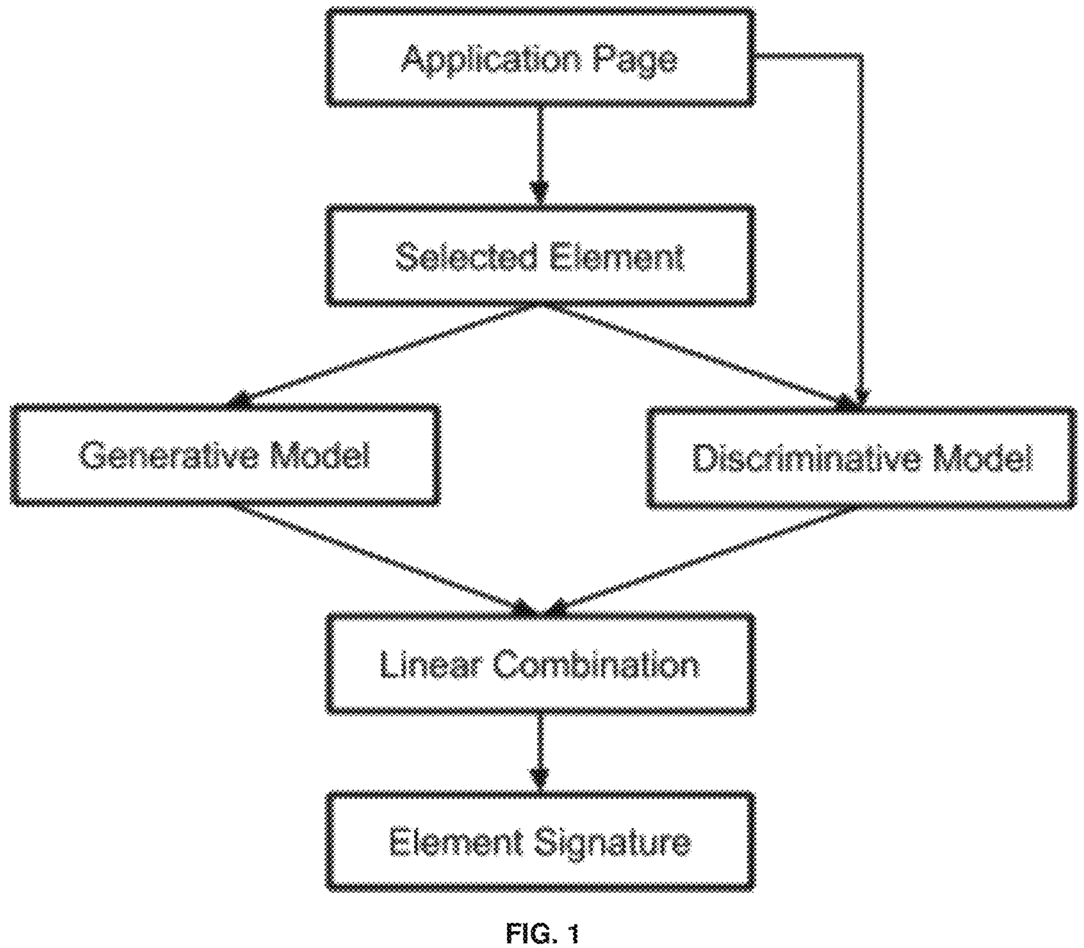
FIG. 1 is a process diagram showing an embodiment of the element selection technology provided herein.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to test case maintenance. In some embodiments, the technology relates to identifying and/or acting upon an element in a software application and particularly, but not exclusively, to systems and methods for identifying elements in a software application using artificial intelligence.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present or "absent") is used in a relative sense to describe the amount or level of a particular entity.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "web application" refers to a client-server computer program that is executed by the client in a web browser. Common web applications include webmail, online retail sales, and online auction. In some embodiments, the web application comprises a user interface and/or client-side logic (e.g., code executed on a client computer). In some embodiments, a web application comprises one or more web pages and the user interface refers to the appearance, design, and elements of the one or more web pages.

As used herein, the term "element" refers to a UI visual component and/or data structure that can be identified by an element definition, an identifier, and/or relationships with one or more other elements. For example, an element may have a unique identifier that is a string, such as a name, number, or symbol. Accordingly, the element may be referenced and/or retrieved using the identifier. Further, if a particular element is the first child element of a parent element, then the particular element may be referenced and/or retrieved using a pointer to the parent element and then retrieving a pointer to the first child element. A browser and/or runtime environment may provide one or more Application Programming Interfaces ("APIs") for referencing and/or retrieving elements. Thus, in some embodiments, the term "element" refers to a component of a software application (e.g., a web application (e.g., a graphical component of a graphical user interface of an application)) with which a user (e.g., a person, another application, an application programming interface, etc.) interacts. In some embodiments, interacting with an element causes the application to perform a function.

In some embodiments, an "element" is a button, hyperlink, text box, text area, check box, slider, radio button, menu, menu item, scroll bar, drop down menu, list item, combo box, toggle button, spin button, tool bar, widget, image, window, calendar, tab strip, list box, thumbnail, etc. In some embodiments, an element is a web page or screen. In some embodiments, an element comprises other elements, e.g., a web page comprising one or more buttons, text fields, etc. In some embodiments, source code corresponding to an element or associated with an element is mappable to a visible element presented on a screen of a client device for viewing by a user. An element has one or more attributes and/or attribute values, e.g., that can be provided by analyzing the visual render, text, code, and/or context of the element.

As used herein, the term "target element" is an element on which an action (e.g., of a test case and/or a step of a test case) is to be performed (e.g., by the test case and/or step of a test case). For example, if a step of a test case is "click on the login button", the element that is the login button is the target element of the test case step.

As used herein, the term "attribute" refers to data that identify and/or describe the appearance, behavior, and/or content of an element. An element may have any number of attributes, e.g., element type; location on a screen, window, or page; color; text; size; border; typeface; and code associated with the element. In some embodiments, attributes have "attribute values"—for example, the location attribute may have an attribute value comprising x, y coordinates describing a screen location. Attribute values may be integral, continuous, and/or discontinuous; numbers; classes; types; categories; etc.

As used herein, the term "visual render" of an element refers to the visual (e.g., graphical) representation of visual attributes and/or attribute values of an element as rendered on a software application (e.g., web application (e.g., a web page)) UI. In some embodiments, visual attributes and/or attribute values of an element are provided by analyzing the visual render (e.g., a bitmapped screen shot) of a UI to identify elements on the UI and assign element attributes and/or attribute values to the elements of the UI.

As used herein, the term "language" or "text" of an element refers to the text attributes and/or attribute values of an element, e.g., the characters (e.g., ASCII, Unicode, etc.) and/or strings of characters that are associated with an element. In some embodiments, text attributes and/or attribute values of an element are words or phrases (e.g., comprising one or more words separated by a non word space) displayed within, around, and/or near an element.

As used herein, the term "code" of an element refers to data that defines attributes and/or attribute values of the element and/or software code that produces the element on a software application (e.g., a web application (e.g., a web page)) UI, e.g., software that causes an image of the element to be produced on a display when the code is executed. As used herein, in some embodiments, the code of an element is an attribute of an element; in some embodiments, analysis of the code of an element provides one or more attributes and/or attribute values of an element.

As used herein, the term "context" of an element refers to an attribute of the element describing the relationship of the element to other elements of a software application (e.g., web application (e.g., web page)) UI. In some embodiments, the context of an element comprises one or more of: the distance between the element and other element, element attributes and/or attribute values of the element and other elements, distributions of element attribute values on the UI, and/or relative location of the element with respect to other elements. In some embodiments, the context of an element is determined for an element based on elements (e.g., element location, element attributes and/or attribute values, distribution of attribute values, distances between elements) in the "local neighborhood" of the element. As used herein, the "local neighborhood" of an element is a region of a UI that is closer in distance to an element than the distance to other regions of the UI that are not in the local neighborhood. In some embodiments, the local neighborhood is defined by a distance cutoff describing a locus or region surrounding the element. In some embodiments, the local neighborhood is defined by the nearest neighboring elements to an element (e.g., the set of elements closest to an element). In some embodiments, the local neighborhood is defined by the nearest neighboring elements to an element (e.g., the set of elements closest to an element) and the next-nearest neighboring elements to the element (e.g., the set of elements closest to an element and the set of elements next closest to the element). In some embodiments, the local neighborhood is defined by the nearest neighboring elements to an element (e.g., the set of elements closest to an element), the next-nearest neighboring elements to the element (e.g., the set of elements closest to an element and the set of elements next closest to the element), and the next-next-nearest neighboring elements to the element (e.g., the set of elements closest to an element, the set of elements next closest to the element, and the set of elements next closest to the element outside the closest and next closest elements).

As used herein, a "selector" is a logical rule or pattern that identifies a set of elements, e.g., a set comprising zero (an empty set), one, or a plurality of elements. In some embodiments, a selector identifies elements specified by element type, elements specified by element attribute (e.g., id, class, etc.), and/or elements specified by element location (e.g., by element location relative to other elements).

As used herein, the term "user" refers to a person (e.g., real or virtual) that interacts with an application (e.g., with an element of an application). In some embodiments, a user is a person (e.g., that interacts with an application through a graphical user interface). In some embodiments, a user is another application (e.g., a script) or software component that interacts with an application.

As used herein, the terms "module" or "component" refer to hardware or software implementations configured to perform the actions of the module or component. In some embodiments, a module or component is a software object or software routine that is stored on and/or executed by general purpose hardware (e.g., computer-readable media, processing devices, etc.). In some embodiments, components and/or modules are implemented as objects or processes that execute on a computing system (e.g., as separate threads). While some of the systems and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

As used herein, the term "browser" refers to a software application for retrieving, presenting, and traversing information resources on the World Wide Web, such as, for example, Mozilla Firefox, Internet Explorer, Microsoft Edge, Google Chrome, Apple Safari, or any other web browser provided for use on a desktop, laptop, and/or mobile device.

As used herein, the term "user interface" (UI) refers to a program interface that utilizes displayed graphical information to allow a user to control and/or operate a software application (e.g., a web application (e.g., a web page)), for example, by a pointer and/or a pointing device. A pointer may refer to a cursor, arrow, or other symbol appearing on a display and may be moved or controlled with a pointing device to select objects, populate fields, input commands, etc. via the UI. A pointing device may refer to any object and/or device used to control a cursor and/or arrow, to select objects, to populate fields, or to input information such as commands and/or drop-down menu options, for example, via a UI of the web application. Such pointing devices may include, for example, a mouse, a trackball, a track pad, a track stick, a keyboard, a stylus, a digitizing tablet, a digital pen, a fingertip in combination with a touch screen, etc. A cursor may refer to a symbol or pointer where an input selection or actuation may be made with respect to a region in a UI.

As used herein, the terms "click" or "clicking" refer to a selection process made by any pointing device, such as a mouse, for example, but use of such terms is not intended to be so limited. For example, a selection process may be made via a touch screen. In such a case, "clicking" may be replaced by "touching" or "tapping". However, these are merely examples of methods of selecting objects or inputting information, and claimed subject matter is not limited in scope in these respects.

As used herein, the term "test case" refers to a defined set of actions and/or inputs performed on a software application that generates a defined set of outputs. Generally, a test case includes instructions specifying actions and/or inputs, predicted results, and a set of execution conditions. The test case can be viewed as a predetermined collection of one or more actions involving one or more elements of a software application. In some embodiments, a test case comprises a series of actions and/or inputs executed in a predetermined order specified in a test case script to simulate use of a software application or system by a user. Each input and/or action executed may be represented by individual test cases that can be joined together to represent a more complex sequence of actions within a larger test case. In some embodiments, a test case is executed to identify errors needing repair in a software application or in components of an interrelated system.

As used herein, the term "script" refers to an implementation of a test case in a particular script language. In some embodiments, a script is a written description of the set of inputs and/or actions to be executed in a test case and a list of expected results for comparison to the actual results. A script is typically associated with each test case. The instructions for inputs and/or actions to execute in a script may be written in descriptive terms to tell a human operator what transactions to execute or it may comprise or access computer instructions to execute the transactions automatically without human user interaction or with minimal or reduced human user interaction. In some embodiments, a script may comprise a combination of computer-executed and human-executed instructions.

Software Applications

As described herein, the technology relates to maintaining a test case for a software application (e.g., a web application (e.g., a web page)) comprising a UI. A web application may comprise one or more web pages. A web application may communicate with a database. While some embodiments are described with respect to a web application, the technology is not so limited and includes software applications that may or may not be web applications and/or that may or may not be executed by a browser. The technology finds use in testing any software application that comprises a UI comprising elements.

In some embodiments, the technology finds use in testing a software application that is a web application. In some embodiments, a server computer runs code for the web application on a server side that serves web pages, files, and other content to a web browser executing the web application on the client side. In some embodiments, a client-side application executes without the use of a browser. In some embodiments, the web application has elements that are identified, located, and monitored using computer vision and/or analysis of source code. In some embodiments, element attributes and/or attribute values are determined and/or assigned to an element using computer vision, image analysis, text extraction, text embedding, analysis of source code, and/or analysis of element context.

For example, in some embodiments, a web application that executes on the client side as a series of HTML web pages includes identifiable Document Object Model (DOM) elements. In the HTML DOM, the element object represents an HTML element. HTML element objects can have child nodes (e.g., type element node, text node, or comment node). HTML element objects may also have attributes and/or attribute values. Thus, in some embodiments, elements (e.g., DOM elements) can be located and monitored by embodiments of the technology provided herein that identify, locate, and monitor elements using computer vision and/or analysis of source code (e.g., to reference and/or retrieve an element by a unique identifier and/or by a relative and/or absolute location in a DOM). In some embodiments, element attributes and/or attribute values (e.g., DOM elements) are determined and/or assigned to an element using computer vision, image analysis, text extraction, text embedding, analysis of source code, and/or analysis of element context.

In some embodiments, the web application has elements that can be identified, located, and monitored without using standard DOM elements. For example, these elements may be defined using XML files, JSON files, or any other proprietary file type. Accordingly, in some embodiments, the technology relates to an automated testing utility that is configured to identify, locate, and monitor these elements based on computer vision, image analysis, text extraction, text embedding, analysis of source code, and/or analysis of element context to identify elements from one version of software to a subsequent version of the software. In some embodiments, element attributes and/or attribute values are determined and/or assigned to an element using computer vision, image analysis, text extraction, text embedding, analysis of source code, and/or analysis of element context. In embodiments where a web application has multiple screens or pages, each screen or page may be defined as a separate web element with elements contained inside the parent element.

Testing

In some embodiments, the technology provides an automated testing utility that provides tools to produce test cases and execute scripts for testing a software application (e.g., a web application, e.g., for web browser automation) comprising a UI. Thus, in some embodiments, each script defines at least one input, action, or event that occurs within a software application (e.g., a web browser) such as, e.g., an interaction with an element (e.g., a click, touch, or tap; item selection; data input; etc.) In some embodiments, the automated testing utility is provided as a plug-in for a web browser. In some embodiments, the automated testing utility does not require a user (e.g., a developer, a software engineer) to write a script comprising a number of steps de novo. In some embodiments, the automated testing utility includes controls to record and edit specific actions or events, controls that facilitate adding test specific commands to the script, and/or a component to perform natural language processing to translate English phrases into script steps.

Element selection

Embodiments of the technology relate to maintaining a test case, e.g., by identifying an element on a UI that is a target element on which a test case step (e.g., action) acts during execution of a test case. Identifying elements on which test case steps (e.g., actions) act is particularly important for software applications (e.g., web applications) comprising a UI that changes, e.g., a UI comprising an element whose position or other attribute(s) changes from one version of the software application (e.g., software application UI) to a subsequent version. For example, the technology provides methods and systems for maintaining a test case that acts on an element having a position, text string, and/or appearance after the position, text string, and/or appearance of the element changes by identifying the element using machine learning and statistical models.

According to embodiments of the technology and as described below, methods and systems are provided that produce an element definition (e.g., a signature or "fingerprint" of an element) using attributes and/or attribute values of the element such as, e.g., the visual render of the element, text associated with the element, code that generates the element, and/or the surroundings and relationship of the element to other elements (element context). In some embodiments, statistical models are used to produce the element definition. In some embodiments, an element match score is produced for each element of a software application UI based on comparing the element definition to the target element definition describing the target element of the test case and/or test case step. In some embodiments, the success of identifying the correct UI element as the target element is used as an input to train a machine learning component (e.g., a neural net) to improve identifying a target element of a UI.

Figure 2:
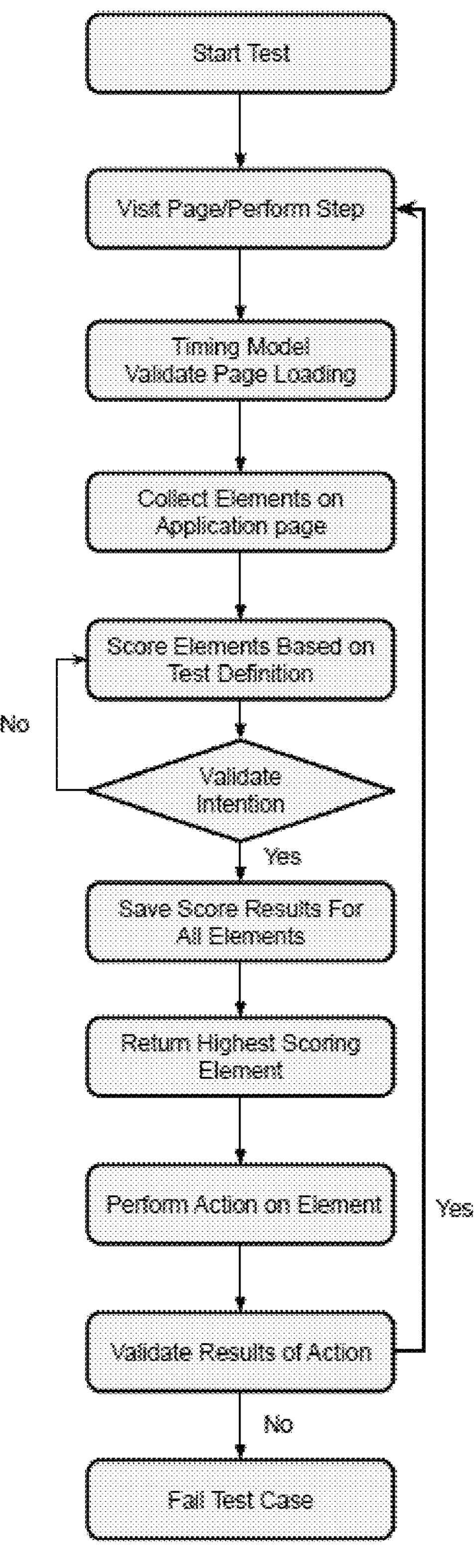
FIG. 2 is a process diagram showing an embodiment of an element selection technology provided herein.

For example, in some embodiments, the technology provides methods for selecting an element, e.g., for identifying a target element upon which to act according to an action described by a test case and/or a step of a test case. As shown in FIG. 2, embodiments of the technology provide a method comprising starting a test, e.g., starting a test case to test a software application (e.g., a web application comprising a UI). Next, in some embodiments, methods comprise visiting a web page (e.g., loading a web page in a browser). In some embodiments, methods comprise performing a step of a test case. In some embodiments, a test case comprises multiple steps. In some embodiments, a test case comprises a single step (e.g., click or tap an element, input text into an element, select an element, etc.)

In some embodiments, methods comprise validating that a page is loaded before performing a test step. Validating that a page is loaded before proceeding ensures and/or maximizes the probability that the target element has been provided on the UI of the software application and thus the target element can be acted upon by a test case action. In some embodiments, methods comprise providing and/or using a timing model to validate that a page is loaded (e.g., in some embodiments, validating that a page is loaded comprises using a timing model). In some embodiments, the timing model predicts an amount of time that will elapse from initiating the loading of a page to completing the loading of the page. In some embodiments, the timing model predicts an amount of time that will elapse from initiating the loading of a page to completing the loading of the page by analyzing page content (e.g., simpler pages load more quickly than more complicated pages). In some embodiments, the timing model predicts the amount of time from initiating the loading of a page to completing the loading of the page using data describing previous page loading times. In some embodiments, the timing model predicts an amount of time that will elapse from initiating the loading of a page to completing the loading of the page (and, optionally, a standard deviation or other error in the prediction) using machine learning, e.g., using data describing previous page loading times to train a neural net or other machine learning model. In some embodiments, the model comprises calculating the mean (and, optionally, the standard deviation) of previous page loading times. In some embodiments, methods comprise identifying a successful page loading when the page loads within a range of time that is the mean±the standard deviation of previous page loading times. In some embodiments, a user is alerted if the page loads in a time that is outside of the range of time that is the mean±standard deviation of page loading times.

After validating that a page is loaded, the technology comprises collecting (e.g., identifying) each of the elements on the page and/or one or more of the elements on the page. In some embodiments, data describing one or more (e.g., in some embodiments, all) of the elements of the UI are stored. In some embodiments, element attributes and/or attribute values are provided and/or determined. In some embodiments, element attributes and/or attribute values are determined by analyzing the visual render of the page and/or elements on the page, by analyzing text associated with elements on the page, by analyzing code that produces elements on the page and/or that is associated with elements on the page, and/or by analyzing the context of elements on the page. In some embodiments, the attributes and/or attribute values of each element are stored. Next, in some embodiments, the technology comprises producing an element definition for each element of the UI (e.g., a UI of a page) identified by the technology. In some embodiments, producing the element definition comprises assigning attributes and/or attribute values to elements according to a technology as described herein (see, e.g., the section entitled "Element Definition"). In some embodiments, producing an element definition comprises using an element definition model that produces the element definition using one or more of the element visual render, a text string of the element, the code that generates the element, and/or element context (e.g., the surroundings and relation of each element to other elements and distributions of element attribute values).

In some embodiments, the element definition model comprises attribute weights and/or assigns weights to one or more attributes and/or attribute values, e.g., the element visual render, a text string of the element, the code that generates the element, and/or the element context (e.g., surroundings and relation to other elements and distributions of element attribute values). In some embodiments, computer vision, code analysis, natural language processing, machine learning, neural nets, and/or other technologies described herein is/are used to quantify the element visual render, a text string of the element, the code that generates the element, and/or element context (e.g., the surroundings and relation to other elements and distributions of element attribute values) and produce the element definition according to the element definition model. In some embodiments, the technology comprises producing a page definition (e.g., a "page signature" or "page fingerprint") comprising element definitions. In some embodiments, comparing a page definition to a previous page definition identifies a page as comprising a change. In some embodiments, comparing a page definition to a previous page definition identifies a page as being the same.

Next, in some embodiments, the technology scores each element of the UI by calculating an element match score that describes the quality of the match of the target element of the test case and/or a step of a test case to each element definition produced by the element definition model as described herein. In some embodiments, the technology scores each element on the UI by calculating an element match score that describes the likelihood that each element definition produced by the element definition model as described herein is the target element of the test case and/or a step of a test case.

In some embodiments, the methods and systems optionally comprise a step of validating the intention of the test and/or a test step. That is, in some embodiments, the technology determines a test case and/or test step intention (e.g., using an intention model) to validate elements in the scoring process. As described herein, a software test case comprises a sequence of actions and elements on which those actions are performed. In some embodiments, a written description of the test case and/or test case step is included in the test case definition. In some embodiments, the written description of the test case and/or test case step is provided in a scripting language and, in some embodiments, the written description of the test case and/or test case step is provided in natural language. An example of a test step description is provided in FIG. 15, e.g., "click on the first element in the list." In some embodiments, a natural language test case description is included and the natural language test case description is used to provide a test case and/or test case step intention model. In some embodiments, after elements have been scored as described herein, the highest scoring element is validated against the intention of the test case step (e.g., as determined by the test case and/or test case step intention model). See, e.g., Example 2 and FIG. 15. In some embodiments, an attribute of a targeted element in a test case definition has changed. Thus, while, in some embodiments, the element scoring process successfully identifies the target element. In some embodiments, the element scoring process may assign a high score to elements surrounding it containing similar code attributes and position. However, in some embodiments, when the target element identified by the scoring process is compared with the target element identified by the test case and/or test case step intention model, validation fails because the scoring process identifies the incorrect element. In some embodiments, if this validation fails, the results from the step intention model are intersected with the results from the element scoring processes to redefine and re-identify the target element. This process results in correctly selecting the target element and produces a successful validation. In some embodiments, the test case definition is edited to store the new target element representation for subsequent test runs.

In some embodiments, each element match score is stored. In some embodiments, the highest element match score is identified and returned, e.g., to identify the element with the highest likelihood of being the target element upon which to act during the test case or step of a test case. Then, the action defined by the test case or step of the test case is performed on the element identified as the target element according to the highest element match score. The results of the action are evaluated and/or validated to determine if the correct element was identified and acted upon by the test case or step of the test case. In some embodiments, validating the results of the action of the test case or step of the test case upon the element identified as the highest target element according to the highest element match score comprises assigning a test case outcome (e.g., a "test successful" or "test failed") value to the test case and/or step of the test case. In some embodiments, the test case or step of the test case, element definition, element match score, highest element match score, and/or test outcome value are provided to a machine learning component of the technology, e.g., to update and/or adapt the model for the success or failure of the test so that it performs better in subsequent test cases (e.g., in subsequent element scoring and identification). In some embodiments, a "test failed" test case outcome is reported to a user. In some embodiments, the technology comprises producing an element definition and element match score in an iterative (e.g., sequential) manner for each element of a UI. In some embodiments, the technology comprises producing an element definition and element match score in parallel (e.g., using parallel computing) for each element of a UI. In some embodiments, the technology comprises producing an element definition and element match score in parallel using a plurality of virtual machines. In some embodiments, the technology comprises producing an element definition and element match score in parallel using a plurality of virtual machines produced using cloud computing.

Figure 3A:
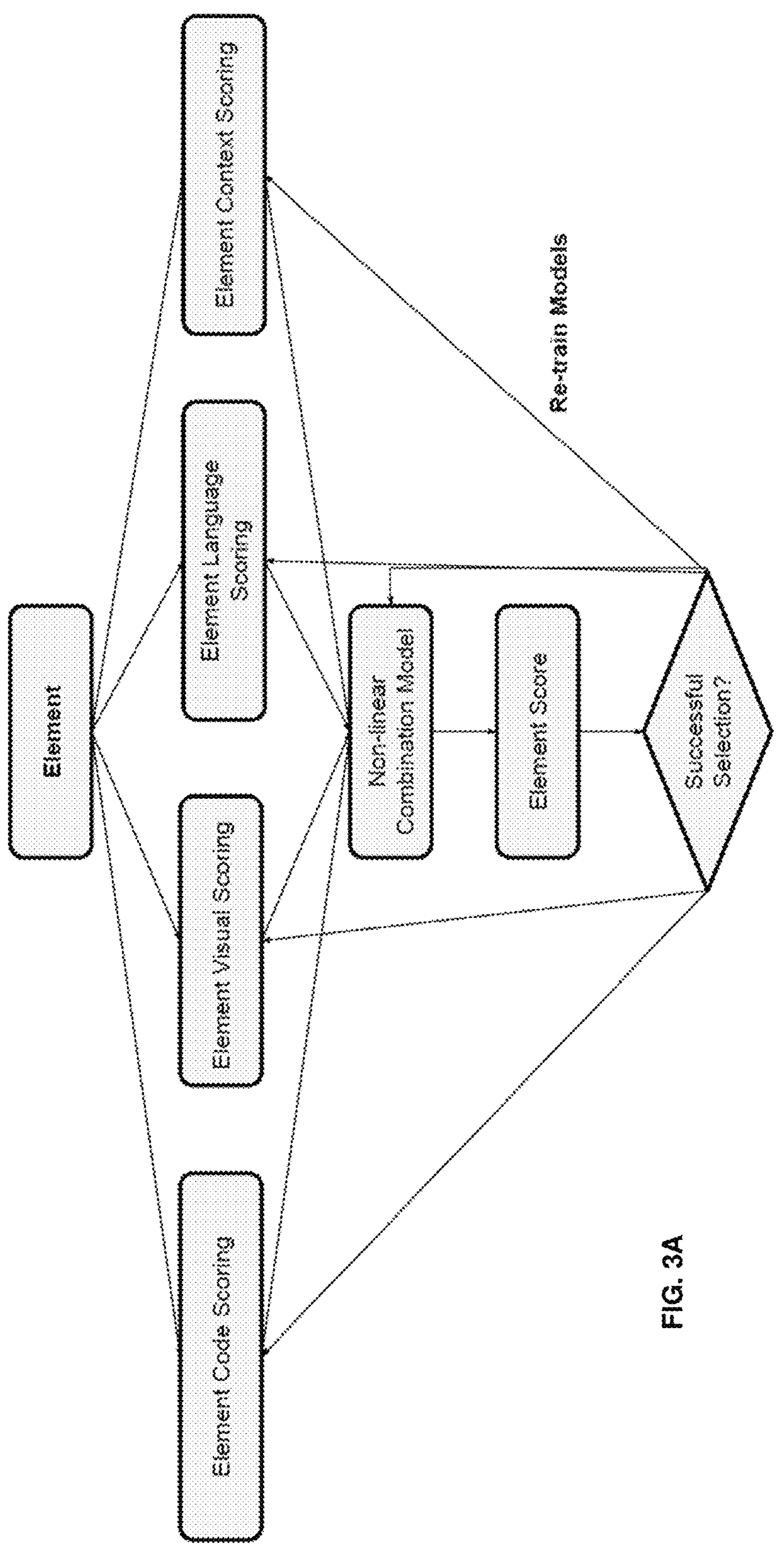
FIG. 3A is a schematic drawing showing an embodiment of a complete scoring model for producing element match scores according to the technology provided herein.
Figure 3B:
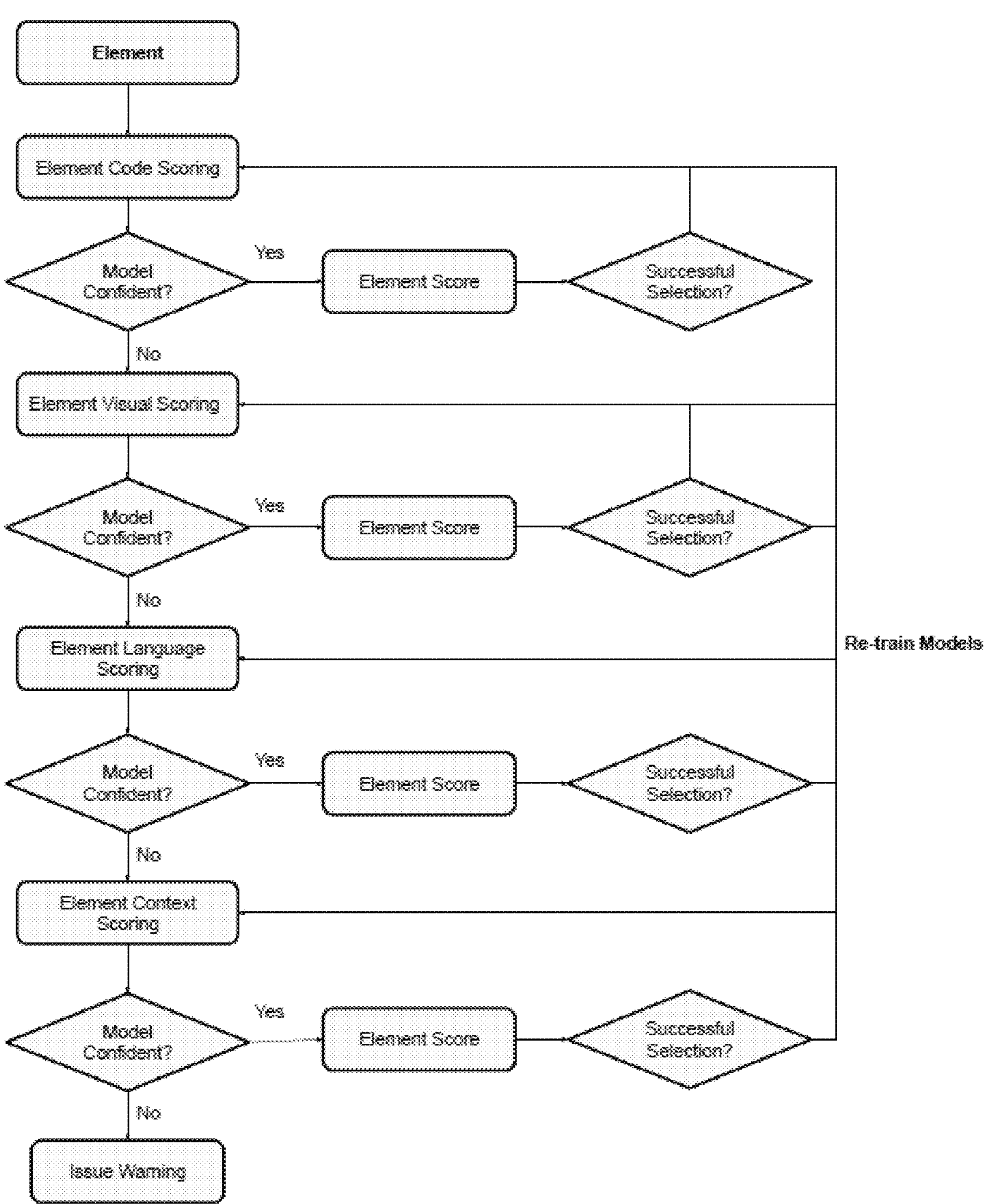
FIG. 3B is a schematic showing an embodiment of a performance optimized scoring model for producing element match scores according to the technology provided herein.

In some embodiments, e.g., as shown in FIG. 3A and FIG. 3B, scoring an element (e.g., producing an element match score) comprises use of a complete scoring model and/or a performance optimized scoring model.

In some embodiments, the technology scores an element (e.g., produces an element match score) using a complete scoring model that evaluates a match between an element definition (e.g., describing an element on a UI) and a target element definition. In some embodiments, data are input into the complete scoring model. In some embodiments, the data input into the complete scoring model comprise data describing the visual render of the element (element render data), text (e.g., a text string) of the element (element text data), code that generates the element (element code data), and/or element context (e.g., data characterizing the elements surrounding an element and the relationships between an element and other elements on the page). See FIG. 3A. In some embodiments, the technology comprises independently calculating a render match score, a text match score, a code match score, and/or a context match score by comparing render data, text data, code data, and/or context data provided by an element definition identifying a target element and the render data, text data, code data, and/or context data, respectively, of an element on a page and the element match score is produced from the individual render match score, text match score, code match score, and/or context match score (see, e.g., FIG. 3A). In some embodiments, the technology comprises calculating an element match score by producing a target element definition using render data, text data, code data, and/or context data provided by an element definition identifying a target element (e.g., provided by a test case) and producing an element definition for an element of the UI using the render data, text data, code data, and/or context data of an element on a page and the element match score is produced from the target element definition and the element definition of the element on the page. In some embodiments, a model (e.g., a combination model (e.g., a non-linear combination model)) is produced from the render match score, text match score, code match score, and/or context match score. In some embodiments, the model produces an element match score. In some embodiments, the model is trained and/or retrained using inputs describing the success or failure of the test case, the render match score, text match score, code match score, context match score, and/or element match score.

In some embodiments, the technology scores an element using a performance optimized scoring model. In some embodiments, data are input into the performance optimized scoring model. In some embodiments, the data input into the performance optimized scoring model comprise data describing the visual render of the element (element render data), text (e.g., a text string) of the element (element text data), code that generates the element (element code data), and/or element context (e.g., data characterizing the elements surrounding an element and the relationships between an element and other elements on the page). See FIG. 3B. The performance optimized model produces an element definition using a first type of element data that is one of element render data, element text data, element code data, or element context data. An element match score is produced from the element definition and an element definition of the target element using the same first type of element data. The model is evaluated to characterize (e.g., by a statistical measure) the confidence of the model to identify the correct element on the page as the target element of the test case or step of the test case. If the confidence of the model is not sufficient, the element definition and target element definition are updated using a second, different type of element data that is one of element render data, element text data, element code data, or element context data. The model is evaluated to characterize (e.g., by a statistical measure) the confidence of the model to identify the correct element on the page as the target element of the test case or step of the test case. If the confidence of the model is not sufficient, the element definition and target element definition are updated using a third, different type of element data that is one of element render data, element text data, element code data, or element context data. The model is evaluated to characterize (e.g., by a statistical measure) the confidence of the model to identify the correct element on the page as the target element of the test case or step of the test case. If the confidence of the model is not sufficient, the element definition and target element definition are updated using a fourth, different type of element data that is one of element render data, element text data, element code data, or element context data.

While FIG. 3B shows an exemplary order of the first, second, third, and fourth types of element data as element code data, element render data, element text data, and element context data, the technology is not limited to this exemplary order of using data types in the performance optimized scoring model. Accordingly, embodiments provide performance optimized scoring models in which the order of data types used to produce element definitions and target element definitions, calculate element match scores, and iteratively evaluate and/or train the model as described above is provided by one of the following ordered lists of data types: element code data, element render data, element text data, element context data; element render data, element code data, element text data, element context data, element text data, element code data, element render data, element context data, element code data, element text data, element render data, element context data, element render data, element text data, element code data, element context data; element text data, element render data, element code data, element context data; element text data, element render data, element context data, element code data; element render data, element text data, element context data, element code data; element context data, element text data, element render data, element code data; element text data, element context data, element render data, element code data; element render data, element context data, element text data, element code data; element context data, element render data, element text data, element code data; element context data, element code data, element text data, element render data; element code data, element context data, element text data, element render data; element text data, element context data, element code data, element render data; element context data, element text data, element code data, element render data; element code data, element text data, element context data, element render data; element text data, element code data, element context data, element render data; element render data, element code data, element context data, element text data; element code data, element render data, element context data, element text data; element context data, element render data, element code data, element text data; element render data, element context data, element code data, element text data; element code data, element context data, element render data, element text data; and/or element context data, element code data, element render data, element text data.

Test Case Intent

In some embodiments, the technology comprises use of test case intent or test case step intent to improve identifying an element on a software application UI (e.g., a web page UI) as a target element upon which to perform an action. For example, in some embodiments, an element match score is not sufficient (e.g., not sufficiently high) to identify an element as a target element with a sufficient degree of confidence. As an example, one or more of data describing the visual render of the element (element render data), text (e.g., a text string) of the element (element text data), code that generates the element (element code data), and/or element context (e.g., data characterizing the elements surrounding an element and the relationships between an element and other elements on the page) may have changed to a degree such that it is difficult to determine if the element is the same element or a different element relative to a previous version of the UI. Accordingly, in some embodiments, the technology comprises analyzing test cases and/or steps of test cases (e.g., using natural language processing, machine learning, and statistical modeling) to identify the intent of a test case and/or a step of a test case to improve identifying if a changed element is the same element or a different element as in a previous version of the UI. In some embodiments, intent is modeled by evaluating past user interactions with a software application UI, training a machine learning model, and updating and/or retraining the machine learning model. In some embodiments, code describing a test case is analyzed by natural language processing to determine the intent of the test case or a step of the test case.

Figure 16:
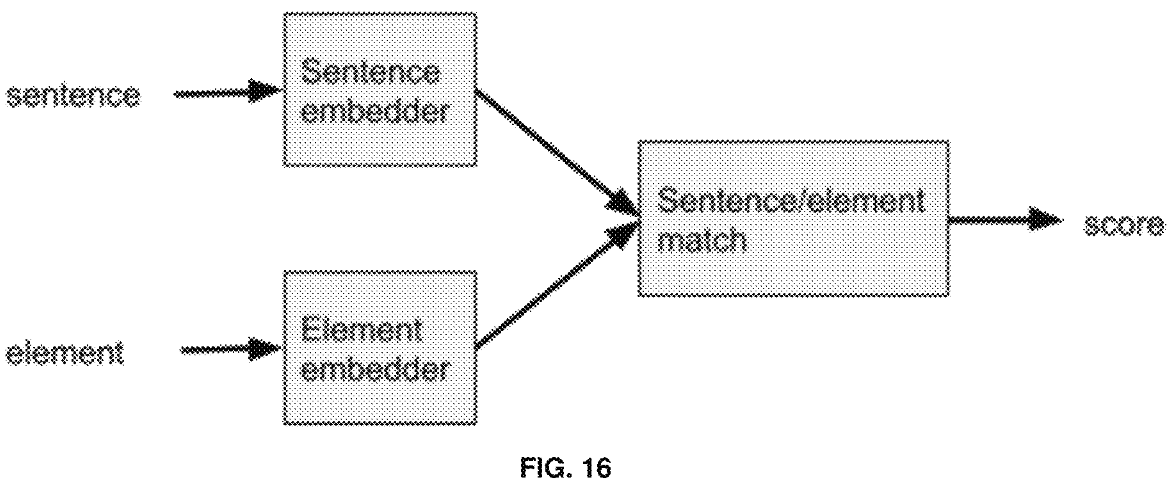
FIG. 16 is a schematic of a step intention model for receiving sentences and elements as inputs, embedding sentences and elements in a sentence embedding network and an element embedding network, respectively, and producing a score representing (e.g., quantifying) the match of the sentence embedding and the element embedding.

In some embodiments, a test case and/or test case step intention model is constructed to identify elements based on a description given by a user and associated with a test step. In some embodiments, the test case and/or test case step intention model assigns a score to each combination of sentence and element (e.g., each sentence-element combination) and chooses the combination with the highest score. See, e.g., FIG. 16.

In some embodiments, the model receives two sets of inputs: 1) sentences that describe an element in a software application (e.g., a web application (e.g., a web page)) UI; and/or 2) all elements of the software application (e.g., web application (e.g., web page)) UI. In some embodiments, the elements are represented by a set of attributes. e.g., as determined by analysis of code (e.g., html representation), visual render, element context, and language as described herein. In some embodiments, the technology comprises transforming an element into a vector form. In some embodiments, the technology comprises: 1) embedding the element inputs using a neural network that embeds each attribute, concatenating the embeddings, and reducing the dimensionality to the same embedding dimension used in the sentence embedding: and 2) embedding the sentence-inputs using a neural network that embeds each word to produce a word embedding and averaging the word embedding to produce a sentence embedding. In some embodiments, the neural network is initialized using natural language processing vectors. In some embodiments, the technology provides an unsupervised learning algorithm for producing vector representations for words. In some embodiments, the learning algorithm is trained using aggregated global word co-occurrence statistics. In some embodiments, the neural network is initialized using the Glove vectors. See, e.g., author Pennington, et al. (2014) "GloVe: Global Vectors for Word Representation" in Empirical Methods in Natural Language Processing (EMNLP), pages 1532-43, incorporated herein by reference. Then, in some embodiments, the outputs from the sentence embedding network and the element embedding network are concatenated and used as inputs for a new neural network, e.g., a network comprising hidden layers and a fully connected layer as output. The output of this model is a score representing (e.g., quantifying) the match of the sentence embedding to an element embedding. See, e.g., FIG. 16.

In some embodiments, the neural network embeddings are trained by collecting examples of element and description tuples. In some embodiments, the technology comprises use of crowdsourcing, e.g., to collect element description tuple data through a graphical user interface. In some embodiments, an element can be labeled by a plurality of descriptions. For example, "the blue button" and "the button in the top left corner" can refer to the same element. In some embodiments, the neural network models are used and are continuously retrained as new tuples of data become available. All neural networks are trained using backpropagation and Adam optimizer. See, e.g., Kingma (2014) "Adam: A Method for Stochastic Optimization" arXiv: 1412.6980 [cs.LG] and version 9 thereof (2017), arXiv: 1412.6980v9 [cs.LG], each of which is incorporated herein by reference.

Element Definition

Figure 4:
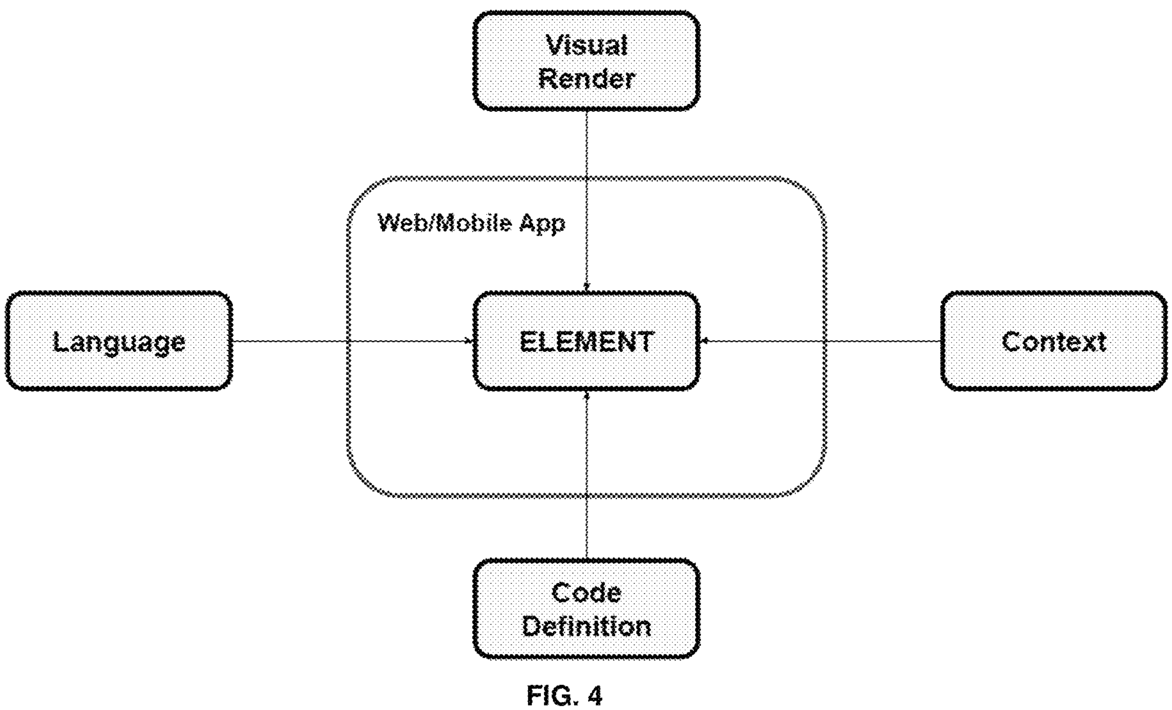
FIG. 4 is a schematic showing the production of an element definition using element render data ("visual render"), element text data ("language"), element code data ("code definition") and/or element context data ("context") according to the technology described herein.

Embodiments of the technology provide methods and systems for defining an element, e.g., methods comprising producing an element definition and systems configured to produce an element definition. In some embodiments, an element definition is used to identify a target element on a software application (e.g., a web application (e.g., a web page)) UI, e.g., using an element match score. As shown in FIG. 4, in some embodiments, an element definition is produced using element attributes and/or attribute values. For example, in some embodiments, an element definition is produced using attribute data that comprises one or more of data describing the visual render of the element (element render data), data describing the text (e.g., a text string) of the element (element text data), data describing the code that generates the element (element code data), and/or element context data (e.g., data characterizing the elements surrounding an element and the relationships between an element and other elements on the page, including, in some embodiments, using distributions of element attribute values). In some embodiments, an element definition is produced by weighting the contributions of one or more attributes, e.g., one or more of the element render data, the element text data, the element code data, and/or the element context data and calculating the element definition from the weighted attributes, e.g., the weighted element render data, the weighted element text data, the weighted element code data, and/or the weighted element context data. In some embodiments, weighting an attribute comprises multiplying a value describing the attribute (e.g., element render data, the element text data, the element code data, and/or the element context data0 by a coefficient and/or adding a value to the value describing the attribute (e.g., element render data, the element text data, the element code data, and/or the element context data).

The technology described herein provides scoring models for evaluating and/or quantifying each of element render data, element text data, element code data, and/or element context data, e.g., for producing an element definition. See, e.g., FIGS. 10, 11, 12, and 13, respectively.

Figure 10:
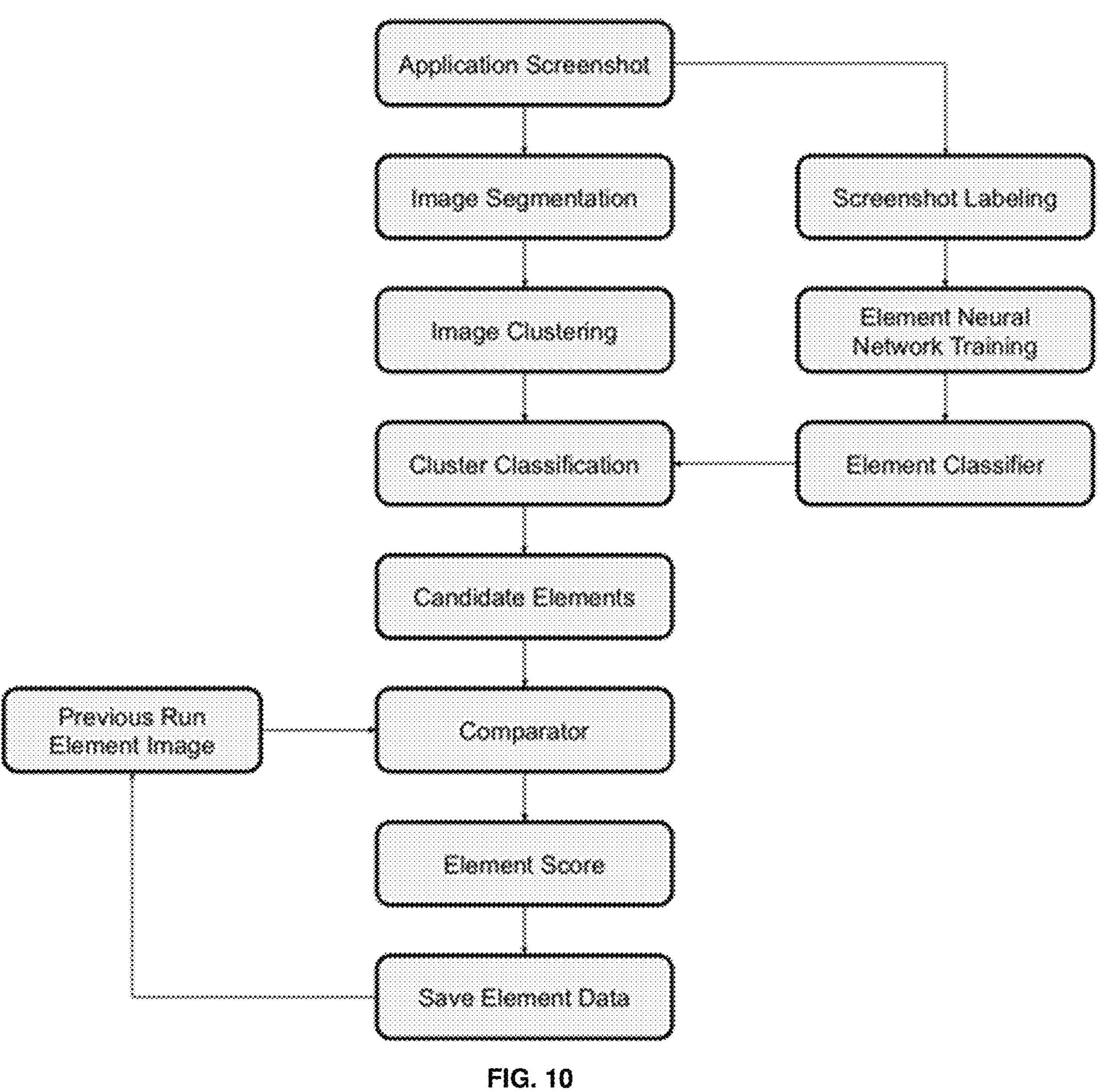
FIG. 10 is a process diagram showing a method for element visual scoring.

For example, as shown in FIG. 10, the technology comprises methods and systems for "element visual scoring", e.g., to provide data (e.g., a quantitative and/or qualitative score) describing the visual render of an element on a software application UI (e.g., a web application UI). In some embodiments, the data (e.g., a quantitative and/or qualitative score) describing the visual render of an element is provided to methods and systems for defining an element, e.g., methods for producing an element definition and systems configured to produce an element definition as described herein. In some embodiments, methods for visual render scoring comprise recording a screen shot of an application UI. In some embodiments, methods for visual render scoring comprise segmenting the screen shot image (e.g., to provide screen shot image segments) and/or labeling the screen shot image (e.g., to provide a labeled screen shot). In some embodiments, methods comprise clustering screen shot image segments to provide screen shot image segment clusters and classifying screen shot image segment clusters to provide one or more classes of screen shot image segments. In some embodiments, methods comprise training an element neural network using the labeled screen shot. In some embodiments, the element neural network provides a neural network classifier that receives elements (e.g., from screen shot labeling) and identifies elements and/or outputs classes of elements and/or assigns an element class to each element and outputs each element and its assigned element class.

In some embodiments, the element visual scoring technology for providing data describing the visual render of an element of a software application identifies candidate elements on the application UI using the classes of screen shot image segments output by the image clustering and cluster classification steps and/or the elements and assigned element classes output by the neural network classifier. In some embodiments, each candidate element is compared with a target element definition to produce an element match score for each element of a software application UI based on the match of each candidate element definition to the target element definition describing the target element of the test case and/or test case step. In some embodiments, comparing each candidate element definition with a target element definition comprises use of a comparison component and/or other image analysis technologies. In some embodiments, element visual scoring comprises use of computer vision. In some embodiments, element visual scoring comprises use of a graphical model of elements on a UI. In some embodiments, element data (e.g., candidate elements, candidate element definitions, target element definitions, and/or element match scores) are recorded (e.g., saved to storage media). In some embodiments, candidate elements (e.g., candidate element data) are compared to element data from previous element visual scoring of an application UI (e.g., to recorded element data). In some embodiments, comparing element data from previous visual scoring of an application UI with candidate element data (e.g., candidate element, element definitions, target element definitions, and/or element match scores) provide data describing element change and/or element sameness between versions of an application UI. In some embodiments, element data (e.g., candidate elements, element definitions, target element definitions, and/or element match scores), element change, and/or element sameness are used to train an element neural net that finds use to classify elements based on visual render data and/or image analysis of an application screenshot.

In some embodiments, the technology provides systems configured to perform methods for "element visual scoring", e.g., to provide data (e.g., a quantitative and/or qualitative score) describing the visual render of an element on a software application UI (e.g., a web application UI). In some embodiments, systems comprise one or more components configured to perform methods for "element visual scoring", e.g., to provide data (e.g., a quantitative and/or qualitative score) describing the visual render of an element on a software application UI (e.g., a web application UI). In some embodiments, systems comprise one or more components configured to perform one or more steps of methods for "element visual scoring", e.g., to provide data (e.g., a quantitative and/or qualitative score) describing the visual render of an element on a software application UI (e.g., a web application UI).

Figure 6:
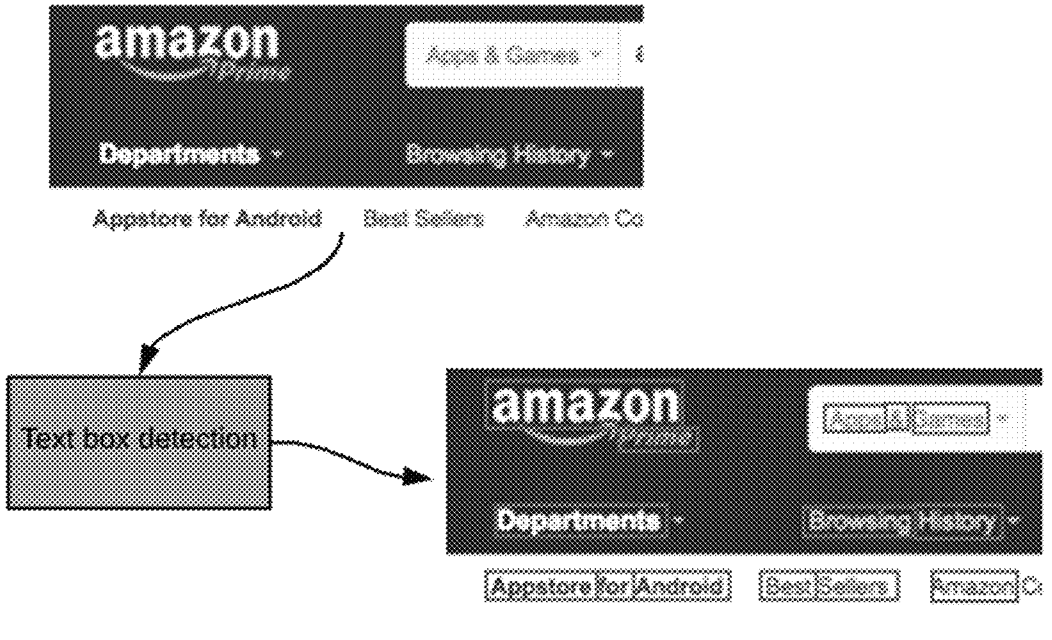
FIG. 6 shows a schematic of an exemplary input web application processed by a text box detection technology and exemplary output produced by the text box detection technology.
Figure 11:
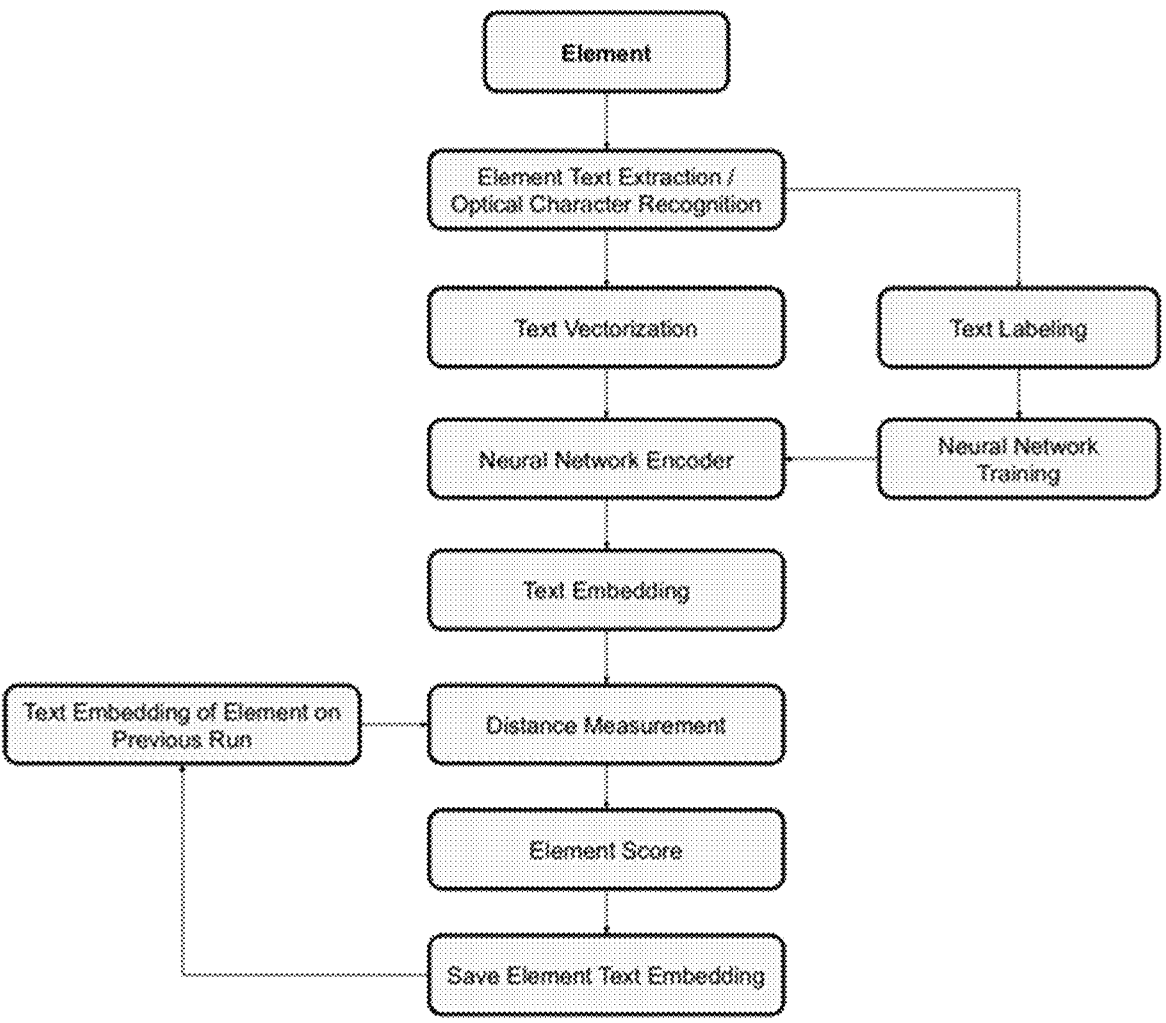
FIG. 11 is a process diagram showing a method for element language scoring.

Further, in some embodiments (e.g., as shown in FIG. 11), the technology comprises methods and systems for "element language scoring", e.g., to provide data (e.g., a quantitative and/or qualitative score) describing the text of an element of a software application UI (e.g., a web application UI). In some embodiments, the data (e.g., a quantitative and/or qualitative score) describing the text of an element is provided to methods and systems for defining an element, e.g., methods for producing an element definition and systems configured to produce an element definition as described herein. In some embodiments, methods for element language scoring comprise identifying an element on a software UI, e.g., identifying an element comprising text. See, e.g., FIG. 6. In some embodiments, methods for element language scoring comprise extracting the text from an element.

In some embodiments, extracting the text from an element comprises use of optical character recognition to produce extracted text. In some embodiments, extracting the text from an element comprises use of computer vision, pattern recognition, and/or pattern matching. In some embodiments, methods comprise vectorizing extracted text to produce vectorized text (e.g., converting a bitmap representation of shapes of letters and characters to a vector representation of letters and characters). In some embodiments, methods comprise labeling extracted text to produce labeled extracted text. In some embodiments, methods comprise training an element neural network using labeled extracted text.

Figure 7:
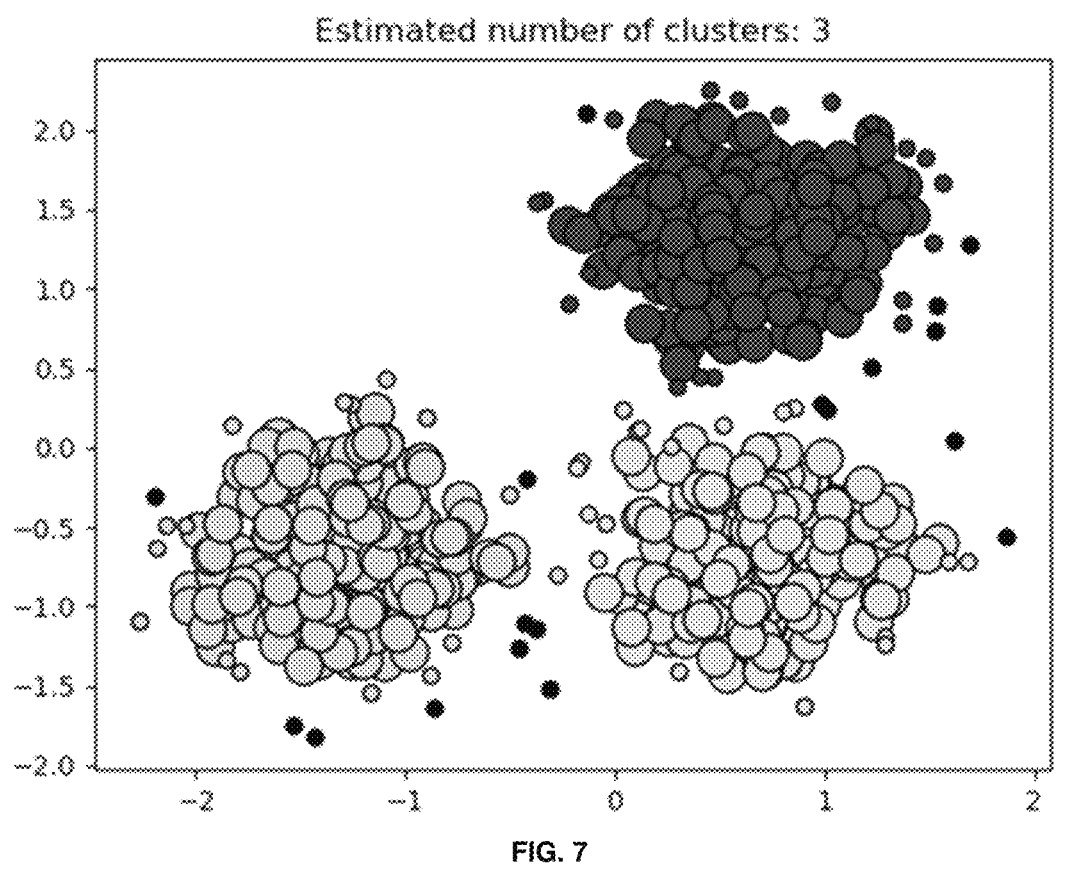
Figure 8:
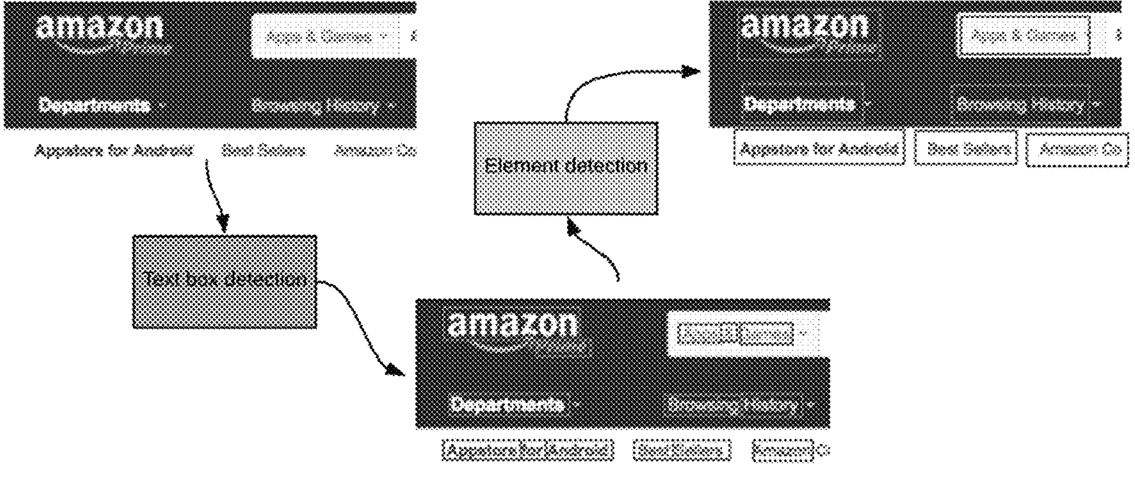
FIG. 8 shows a schematic of an exemplary input web application processed by a text box detection technology and exemplary output produced by the text box detection technology. The output of the text box detection technology is passed to an element detection technology. An exemplary output of the element detection technology is shown.

In some embodiments, the element language scoring technology for providing data describing the text of an element of a software application comprises a neural network encoder that receives as inputs the vectorized text and the output of an element neural network trained using extracted text. In some embodiments, the neural network encoding comprises and/or provides methods and/or systems for text embedding. See, e.g., Mikolov (2013) "Distributed Representations of Words and Phrases and their Compositionality" arXiv: 1310.4546 [cs.CL], incorporated herein by reference. In some embodiments, text embedding comprises text categorization and/or text clustering. See, e.g., Lavelli (2004) "Distributional Term Representations: An Experimental Comparison" in Proceedings of the Thirteenth ACM International Conference on Information and Knowledge Management, pages 615-24, Association for Computing Machinery, New York, New York, incorporated herein by reference. In some embodiments, text embedding comprises mapping words and/or phrases to vectors of real numbers. In some embodiments, text embedding quantifies and/or classifies similarities between text of elements based on co-occurring words and/or phrases (e.g., based on statistical distributions of co-occurring words and/or phrases). In some embodiments, text embedding quantifies and/or classifies similarities between text of elements based on the context in which words and/or phrases occur (e.g., based on statistical distributions of the context in which words and/or phrases occur). In some embodiments, text embedding comprises use of locally linear embedding. See, e.g., Roweis and Saul (2000) "Nonlinear dimensionality reduction by locally linear embedding" Science 290: 2323-26, incorporated herein by reference. In some embodiments, element language scoring comprises measuring the distance between words and/or phrases, e.g., to identify words and/or phrases that belong to the same element and/or to identify words and/or phrases that belong to different elements (e.g., to assign text to elements). See, e.g., FIGS. 6-8.

In some embodiments, the element language scoring technology for providing data describing the text of an element of a software application identifies (and/or provides) text of elements on a software application UI. In some embodiments, the text of each element is compared with the text of a target element (e.g., according to an element definition of the target element) to produce an element text match score for each element of a software application UI based on the match of the text of each element to the target element definition describing the target element of the test case and/or test case step. In some embodiments, element text data (e.g., text of elements, text embedding of elements, element definitions, text of target elements, text embedding of target elements, target element definitions, and/or element text match scores) are recorded (e.g., saved to storage media). In some embodiments, the text (e.g., text embedding) of an element is compared to the text (e.g., text embedding) of the element from previous element language scoring of an application UI (e.g., compared with recorded element text data). In some embodiments, comparing element text data from previous language scoring of an application UI with element text data (e.g., text of elements, text embedding of elements, element definitions, text of target elements, text embedding of target elements, target element definitions, and/or element text match scores) provide data describing element change and/or element sameness between versions of an application UI. In some embodiments, element text data (e.g., text of elements, text embedding of elements, element definitions, text of target elements, text, embedding of target elements, target element definitions, and/or element text match scores), element change, and/or element sameness are used to train an element neural net that finds use to classify elements based on language (e.g., text (e.g., word and/or phrase)) data. In some embodiments, the neural net is used to modify the parameters used to identify words and/or phrases that belong to the same element and/or to identify words and/or phrases that belong to different elements (e.g., to assign text to elements) using distance measurements between text (e.g., words and/or phrases).

In some embodiments, the technology provides systems configured to perform methods for "element language scoring", e.g., to provide data (e.g., a quantitative and/or qualitative score) describing the text of an element on a software application UI (e.g., a web application UI). In some embodiments, systems comprise one or more components configured to perform methods for "element language scoring", e.g., to provide data (e.g., a quantitative and/or qualitative score) describing the text of an element on a software application UI (e.g., a web application UI). In some embodiments, systems comprise one or more components configured to perform one or more steps of methods for "element language scoring", e.g., to provide data (e.g., a quantitative and/or qualitative score) describing the text of an element on a software application UI (e.g., a web application UI).

Figure 12:
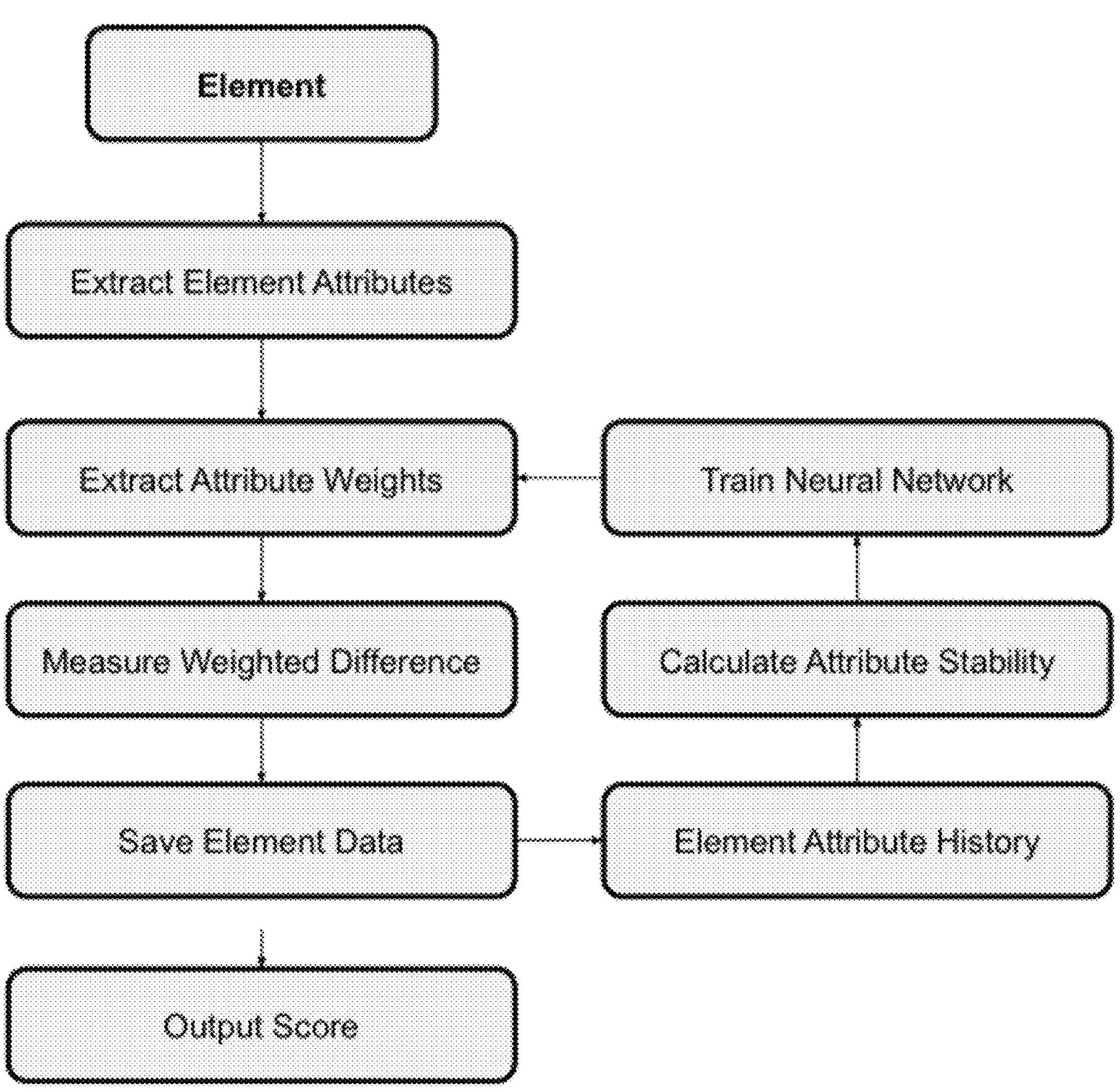
FIG. 12 is a process diagram showing a method for element code scoring.

Further, in some embodiments (e.g., as shown in FIG. 12), the technology comprises methods and systems for "element code scoring", e.g., to provide data (e.g., a quantitative and/or qualitative score) describing the code of an element of a software application UI (e.g., a web application UI), e.g., code that produces an element of a software application. In some embodiments, the data (e.g., a quantitative and/or qualitative score) describing the code of an element is provided to methods and systems for defining an element, e.g., methods for producing an element definition and systems configured to produce an element definition as described herein. In some embodiments, the element code scoring technology for providing data describing the code of an element of a software application identifies (and/or provides) code of elements on a software application UI (e.g., code that produces elements of a software application UI). In some embodiments, the element code scoring technology for providing data describing the code of an element of a software application extracts (and/or provides) the attributes and/or attribute values of elements on a software application UI from each element on the application UI. In some embodiments, attributes and/or attribute values are extracted using text processing, pattern matching, regular expressions, and/or string parsing. In some embodiments, methods comprise extracting and/or assigning attribute weights to attributes to provide weighted attributes. In some embodiments, methods comprise comparing the weighed attributes of each element to the weighted attributes of a target element. In some embodiments, methods comprise producing an element match score for each element by comparing the weighed attributes of each element to the weighted attributes of a target element.

Thus, in some embodiments, the element code scoring technology for providing data describing the code of an element of a software application extracts the attributes and/or attribute values (e.g., weighted attributes) of elements on a software application UI. In some embodiments, the attributes and/or attribute values of each element are compared with the attributes and/or attribute values of a target element (e.g., according to an element definition of the target element) to produce an element code and/or element attribute match score for each element of a software application UI based on the match of the attributes and/or attribute values of each element to the target element definition describing the target element of the test case and/or test case step. In some embodiments, element attribute data (e.g., attributes and/or attribute values of elements, weighted attributes of elements, element definitions, attributes and/or attribute values of target elements, weighted attributes of target elements, target element definitions, and/or element attribute and/or element code match scores) are recorded (e.g., saved to storage media). In some embodiments, the attributes and/or attribute values (e.g., weighted attributes) of an element are compared to the attributes and/or attribute values (e.g., weighted attributes) of the element from previous element code scoring of an application UI (e.g., compared with recorded element attribute data). In some embodiments, comparing element attribute data from previous code scoring of an application UI with element attribute data (e.g., attributes and/or attribute values of elements, weighted attributes of elements, element definitions, attributes and/or attribute values of target elements, weighted attributes of target elements, target element definitions, and/or element attribute and/or element code match scores) provide data describing element change and/or element sameness between versions of an application UI. In some embodiments, element code data (e.g., attributes and/or attribute values of elements, weighted attributes of elements, element definitions, attributes and/or attribute values of target elements, weighted attributes of target elements, target element definitions, and/or element attribute and/or element code match scores), element change, and/or element sameness are used to train an element neural net that finds use to classify elements based on code producing the elements and/or attributes and/or attribute values of elements (e.g., weighted attributes of elements). In some embodiments, the neural net is used to modify the attribute parameters used to identify elements using attributes and/or attribute values. For instance, in some embodiments, recorded element attribute data (e.g., attributes and/or attribute values of elements, weighted attributes of elements, element definitions, and/or element attribute and/or element code match scores) are used to produce an element attribute history describing changes of element attributes and/or attribute values between versions of a software UI.

In some embodiments, the element attribute history is used to calculate an element stability score describing (e.g., quantifying) the types and/or amounts of change of an element as a function of software UI version. See, e.g., Example 1 and FIGS. 14A-14G. In some embodiments, the technology determines a stability of element attributes.

In some embodiments, code scoring is used to determine the values ("states") of the attributes for a plurality of versions of a web application. In some embodiments, the number of times each value ("state") is detected for each attribute is used to produce a histogram showing a distribution for the values that each attribute had over the plurality of versions of the web application. Exemplary histograms are shown in FIGS. 14A to 14G. In some embodiments, the distributions of the values are used to predict the probability that an attribute will have a value according to the detected states. The histograms show the likelihood that an attribute will have a particular value and, accordingly, show the stability of the attribute value. An attribute that has a significant probability of having a different value between versions of a web application UI has a low (e.g., 0) stability. An attribute that has a significant probability of having the same value between versions of a web application UI has a high (e.g., 1) stability.

Further, in some embodiments, the standard deviation of the distribution is used to determine the stability of the attribute over versions of a web application. For example, in some embodiments, a low standard deviation indicates a high stability for the attribute and a high standard deviation indicates a low stability for the attribute.

In some embodiments, the "information" provided by an attribute or an element is determined by calculating an information entropy (S) associated with each possible attribute value (i), e.g., according to an equation in which information is the negative logarithm of the probability mass function for the value:

$$S = -\sum_i P_i \log P_i$$

where $P_i$ is the probability of each attribute value i. Accordingly, when an attribute has a low-probability value, the element having the attribute provides more information than when the attribute has a high-probability value. In some embodiments, element attributes that are more stable are given a higher weighting when used in producing an element definition (e.g., as shown in FIG. 4) and/or a target element match score. In some embodiments, elements providing more information are given a higher weighting when determining the context of an element (e.g., as described herein and shown in FIG. 13).

In some embodiments, the element attribute history is used to calculate an element class stability score describing (e.g., quantifying) the types and/or amounts of change of an element class as a function of software UI version. In some embodiments, the element stability score and/or the element class stability score is used to train a neural network, e.g., to identify elements that change from one software version to another software version and/or to identify elements that are the same from one software version to another software version. In some embodiments, the element stability score and/or the element class stability score is used to train a neural network to produce an element code and/or element attribute match score for each element of a software application UI based on the match of the attributes and/or attribute values of each element to the target element definition describing the target element of the test case and/or test case step.

In some embodiments, the technology provides systems configured to perform methods for "element code scoring", e.g., to provide data (e.g., a quantitative and/or qualitative score) describing the attributes and/or attribute values of an element on a software application UI (e.g., a web application UI). In some embodiments, systems comprise one or more components configured to perform methods for "element code scoring", e.g., to provide data (e.g., a quantitative and/or qualitative score) describing the attributes and/or attribute values of an element on a software application UI (e.g., a web application UI). In some embodiments, systems comprise one or more components configured to perform one or more steps of methods for "element code scoring", e.g., to provide data (e.g., a quantitative and/or qualitative score) describing the attributes and/or attribute values of an element on a software application UI (e.g., a web application UI).

Figure 13:
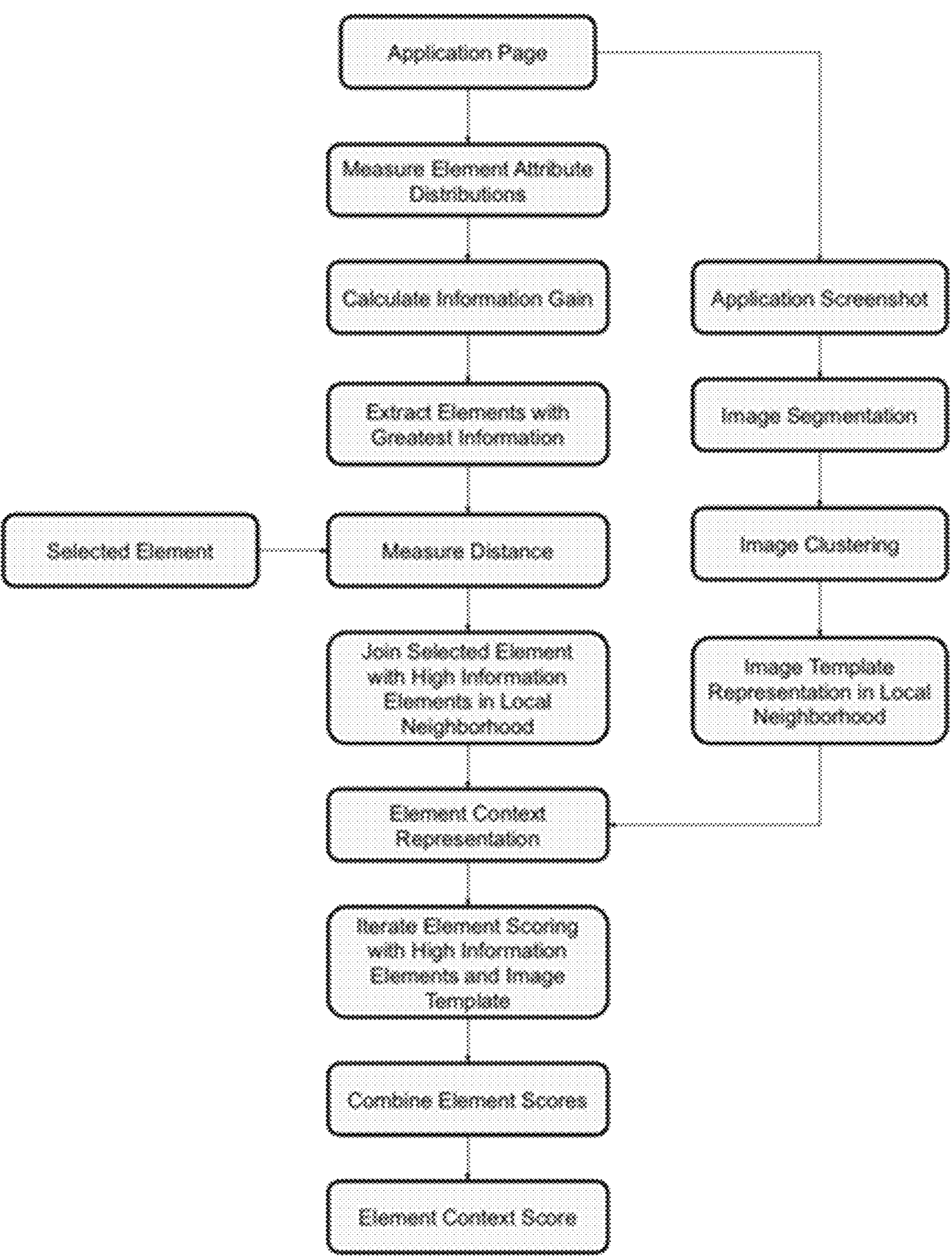
FIG. 13 is a process diagram showing a method for element context scoring.

Further, in some embodiments (e.g., as shown in FIG. 13), the technology comprises methods and systems for "element context scoring", e.g., to provide data (e.g., a quantitative and/or qualitative score) describing the context of an element of a software application UI (e.g., a web application UI), e.g., the relationship of an element to other elements on the UI of a software application. In some embodiments, the data (e.g., a quantitative and/or qualitative score) describing the context of an element is provided to methods and systems for defining an element, e.g., methods for producing an element definition and systems configured to produce an element definition as described herein. In some embodiments, methods for element context scoring comprise providing a UI comprising elements, e.g., providing an application page (e.g., a page of a web application) comprising elements. In some embodiments, methods comprise identifying, extracting, and/or providing attributes and/or attribute values of each element of the application UI. In some exemplary embodiments, the attributes and/or attribute values of elements are provided by computer vision, image analysis, text processing, and/or code analysis, e.g., as described for element visual scoring, element language scoring, and/or element code scoring. In some embodiments, methods comprise producing a distribution of element attribute values for the elements of the application UI. In some embodiments, the distribution of element attribute values for the elements of the application UI is used to calculate information gain for the elements. That is, in some embodiments, methods comprise calculating information gain for elements of an application UI based on a distribution of element attribute values. In some embodiments, methods comprise identifying elements with the greatest information on the application UI. In some embodiments, methods comprise measuring the distances between an element (e.g., each element) and high information elements in the local neighborhood of the element. In some embodiments, methods comprise producing a map and/or a model of the distances between an element (e.g., each element) and high information elements in the local neighborhood of the element. In some embodiments, methods comprise recording a screen shot of an application UI. In some embodiments, methods comprise segmenting the screen shot image (e.g., to provide screen shot image segments). In some embodiments, methods comprise clustering screen shot image segments to provide screen shot image segment clusters. In some embodiments, the methods comprise producing an image template for a screen shot image segment and the screen shot image segments in the local neighborhood (e.g., in the screen shot image segment cluster to which the screen shot image segment belongs) of the screen shot image segment. In some embodiments, methods comprise producing a map and/or a model for a screen shot image segment and the screen shot image segments in the local neighborhood (e.g., in the screen shot image segment cluster to which the screen shot image segment belongs) of the screen shot image segment. In some embodiments, the map and/or a model describes distances and/or relative spatial relationships between a screen shot image segment and the screen shot image segments in the local neighborhood (e.g., in the screen shot image segment cluster to which the screen shot image segment belongs) of the screen shot image segment.

In some embodiments, methods for element context scoring comprise using high information elements and the image template to produce data describing element context, e.g., an element context score. In some embodiments, methods for element context scoring comprise using: 1) the map and/or model of the distances between an element (e.g., each element) and high information elements in the local neighborhood of the element; and 2) the image template for a screen shot image segment and the screen shot image segments in the local neighborhood (e.g., in the screen shot image segment cluster to which the screen shot image segment belongs) of the screen shot image segment to produce data describing element context, e.g., an element context score. In some embodiments, methods comprise iterating the scoring of each element with high information elements and the image template.

In some embodiments, the element context scoring technology for providing data describing the context of an element of a software application provides an element context score for elements on a software application UI. In some embodiments, the context of each element is compared with the context of a target element (e.g., according to an element definition of the target element) to produce an element context match score for each element of a software application UI based on the match of the context of each element to the target element definition describing the target element of the test case and/or test case step. In some embodiments, element context data (e.g., context of elements, element definitions, context of target elements, target element definitions, and/or element context match scores) are recorded (e.g., saved to storage media). In some embodiments, the context (e.g., context score) of an element is compared to the context (e.g., context score) of the element from previous element context scoring of an application UI (e.g., compared with recorded element context data). In some embodiments, comparing element context data from previous context scoring of an application UI with element context data (e.g., context of elements, element definitions, context of target elements, target element definitions, and/or element context match scores) provide data describing element change and/or element sameness between versions of an application UI. In some embodiments, element context data (e.g., context of elements, element definitions, context of target elements, target element definitions, and/or element context match scores), element change, and/or element sameness are used to train an element neural net that finds use to classify elements based on context (e.g., element context score, element context match score) data. In some embodiments, the neural net is retrained to modify the parameters used to identify high information elements and distances for determining the local neighborhood of an element.

In some embodiments, the technology provides systems configured to perform methods for "element context scoring", e.g., to provide data (e.g., a quantitative and/or qualitative score) describing the context of an element on a software application UI (e.g., a web application UI). In some embodiments, systems comprise one or more components configured to perform methods for "element context scoring", e.g., to provide data (e.g., a quantitative and/or qualitative score) describing the context of an element on a software application UI (e.g., a web application UI). In some embodiments, systems comprise one or more components configured to perform one or more steps of methods for "element context scoring", e.g., to provide data (e.g., a quantitative and/or qualitative score) describing the context of an element on a software application UI (e.g., a web application UI).

As described above, the technology comprises use of element visual scoring. element text scoring, element code scoring, and/or element context scoring to produce an element definition for an element and/or each element of an application UI. The element definition is used to compare to a target element (e.g., a target element definition) to identify the target element on the UI for action and/or interaction by a step of a test case.

Monitoring Component

In some embodiments, the technology comprises a component to monitor changes in a software application (e.g., a web application (e.g., a web page)) UI. In some embodiments, the monitoring component obtains and stores screenshots of the web application while an automated test is running. In some embodiments, screenshots are provided to a component that analyzes the visual render and/or text of a UI, e.g., to identify elements and/or to assign element attributes and/or attribute values to elements.

In some embodiments, the monitoring component captures metadata from one or more test cases (e.g., script), the automated testing utility, and/or the web application while the automated test is executing. In some embodiments, the technology provides a monitoring component that is, e.g., an external program, a plugin for a browser, or an extension of the automated testing utility. In some embodiments, the monitoring component captures screenshots and data produced by the automated testing utility. In some embodiments, the monitoring component directly monitors the application that is being tested or the environment that is executing the application (e.g., a web browser). In some embodiments, the monitoring component stores a picture of a web page as a screenshot and the monitoring component stores source code associated with the picture of the web page that was captured as a screenshot. In some embodiments, source code is provided to a component that analyzes source code to identify elements and/or to assign element attributes and/or attribute values to elements. In some embodiments, style sheets and images are recorded with the source code. In some embodiments, the monitoring component executes with the automated testing utility to capture screenshots during testing of a web application and to capture metadata that describes the context in which the test is being performed. In some embodiments, the metadata is specific for a particular automated test (e.g., the metadata is applicable to every screenshot taken while executing the particular automated test (e.g., name of the test script, name of the web application, etc.)) In some embodiments, the metadata is specific for a step or portion of an automated test (e.g., the metadata is applicable to one or more particular screenshots).

Accordingly, embodiments provide a test case (e.g., script) that provides a series of instructions to an automated testing utility and the automated testing utility interacts with a software application (e.g., a web application (e.g., a web page) UI. The monitoring component captures screenshots of the UI of the software application while the test case (e.g., script) is being executed by the automated testing utility. In some embodiments, screen captures are recorded when defined criteria are satisfied, e.g., when certain types of steps are identified in the test case (e.g., script), when certain types of actions or events occur in the software application, or a combination thereof. In some embodiments, screen captures are recorded before they are processed by the automated testing utility or after they are displayed in the UI of the software application. Thus, in some embodiments, the monitoring component tracks an interaction before it occurs by analyzing the test case (e.g., script) and a screen capture occurs before the UI changes. In some embodiments, the monitoring component records a screen capture after a web application responds to actions taken by a simulated user. Screen captures are recorded relative to the monitoring component identifying an action or event occurring in the test case (e.g., script) and waiting for the action event to happen in the web application (e.g., as a change in the UI).

In some embodiments, a user and/or test case (e.g., script) action is a click received as input by a UI and screenshots and associated metadata are recorded during the click. In some embodiments, screenshots and associated metadata are recorded during a web application event, e.g., a validation event, setting flags, variables, or threshold conditions as met, the creation or deletion of a particular element such as a DOM element, communications between the server side web application and the client side web application in either direction or both directions, internal validation functions such as user input being a certain primitive type or a certain length before forwarding the data to a database, successfully executing a sub-routine or function such as scanning for malware, or any combination thereof. In some embodiments, screenshots and associated metadata are recorded during a browser event, e.g., a page loading, completion of page loading, loading a previous page in the browser history, loading a next page in the browser history, opening a new page in a new browser, opening a new page in a new tab, saving a page, printing a page, opening a print preview screen, changing the size of text in a web browser, or any combination thereof. In some embodiments, page loading is evaluated and/or determined to be complete using machine learning and/or a statistical model of page loading time as described herein.

In some embodiments, the monitoring component records emails or printed documents as they are sent during an automated test. In some embodiments, the monitoring component records screenshots that are not part of the UI of a software application, e.g., a confirmation message, notification (e.g., an SMS message, a message sent through social media, or other messaging services known in the art) and/or communications that result from interactions with other external software (e.g., web) applications, such as a software application that uses an external authentication mechanism or emails sent through third party software as part of the software application. In some embodiments, screenshots are recorded and stored, and analysis of the screenshots is used to construct a statistical model. In addition to recording screenshots, the monitoring component records metadata associated with the screenshots captured. In some embodiments, metadata (e.g., the interaction that caused the screenshot to be captured, the location and dimensions of an element that is clicked on a page, the URL of a page that received the click, and the type of user that has accessed the page being clicked) are captured while a screenshot is recorded during an automated test. In some embodiments, metadata include the URL of a webpage that was used to generate the screenshot, the current user, user email, user type (e.g., basic, pro, returning customer, having specific permissions), an account number, user country, user IP address, number of screenshots recorded during a test, the step within a test case (e.g., script) corresponding to the screenshot, or any flags applied to the page. In some embodiments, metadata include, e.g., the name of the test case (e.g., script) or automated test, when the test case (e.g., script) was last updated, the time of the current test, the scripter of the test case (e.g., script) or automated test, the actual or simulated GPS location of a device accessing the web application being tested, time of day during the access, or any combination thereof.

Computer Vision

In some embodiments, the technology comprises use of computer vision to analyze a software application (e.g., a web application (e.g., a web application UI (e.g., a screen shot of a web application UI))). In some embodiments, computer vision provides data describing the visual render of a UI and/or one or more elements on a software application (e.g., web application) UI. In some embodiments, computer vision provides data describing the text (e.g., a text string) of an element (element text data), e.g., by the use of computer vision and optical character recognition (OCR). In some embodiments, computer vision provides data describing the layout of a page, e.g., data characterizing the elements surrounding an element and the relationships between an element and other elements on the page (element context data).

In some embodiments, the technology comprises using computer vision to acquire, process, analyze, and understand digital images (e.g., to understand the visual render of a UI, elements of a UI, and/or to assign attributes and/or attribute values to elements of a UI). As used herein, the term "understanding" refers to transforming visual images into a description of the image that is stored in a database, data structure (e.g., a statistical model), and/or used by subsequent analysis. In some embodiments, element attributes and/or attribute values are determined and stored in a database, data structure (e.g., a statistical model), and/or used for subsequent analysis, e.g., to produce an element definition and/or an element match score.

In some embodiments, understanding comprises producing information from image data using models based on geometry, physics, statistics, and learning theory. In some embodiments, computer vision is used to determine the presence or absence of an element in a web application UI, determine the size and/or location of an element in a web application UI, and/or determine other attributes and/or attribute values of an element in a web application UI. In some embodiments, computer vision recognizes (e.g., identifies) elements and classifies elements, e.g., based on attributes and/or attribute values determined by computer vision analysis of the web application UI. In some embodiments, computer vision comprises use of technologies for producing convolutional neural networks. In some embodiments, computer vision comprises identifying changes in the attributes and/or attribute values of elements for multiple versions (e.g., 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, or more versions) of a web application UI.

In some embodiments, the technology verifies and/or validates a software application (e.g., a web application (e.g., a web page)) UI using computer vision. In some embodiments, a document template validation (DTV) technology comprises a text box detection (TBD) component, a character recognition (OCR) component, an element detection (ED) component, a layout detection (LD) component, and/or a template verification (TV) component (see, e.g., FIG. 5). In some embodiments, the technology provides a method comprising steps that perform document template validation (DTV), e.g., a method comprising detecting a text box, recognizing characters (e.g., text characters), detecting an element, detecting a layout, and/or a verifying a template. In some embodiments, the technology provides a system comprising modules and/or components configured to perform text box detection, character recognition (e.g., optical character recognition), element detection, layout detection, and/or template verification. See, e.g., FIG. 5. In some embodiments, text attributes and/or attribute values are assigned to an element. In some embodiments, text attributes and/or attribute values are provided to a method and/or a component of a system for producing an element definition and/or an element match score as described herein.

Figure 5:
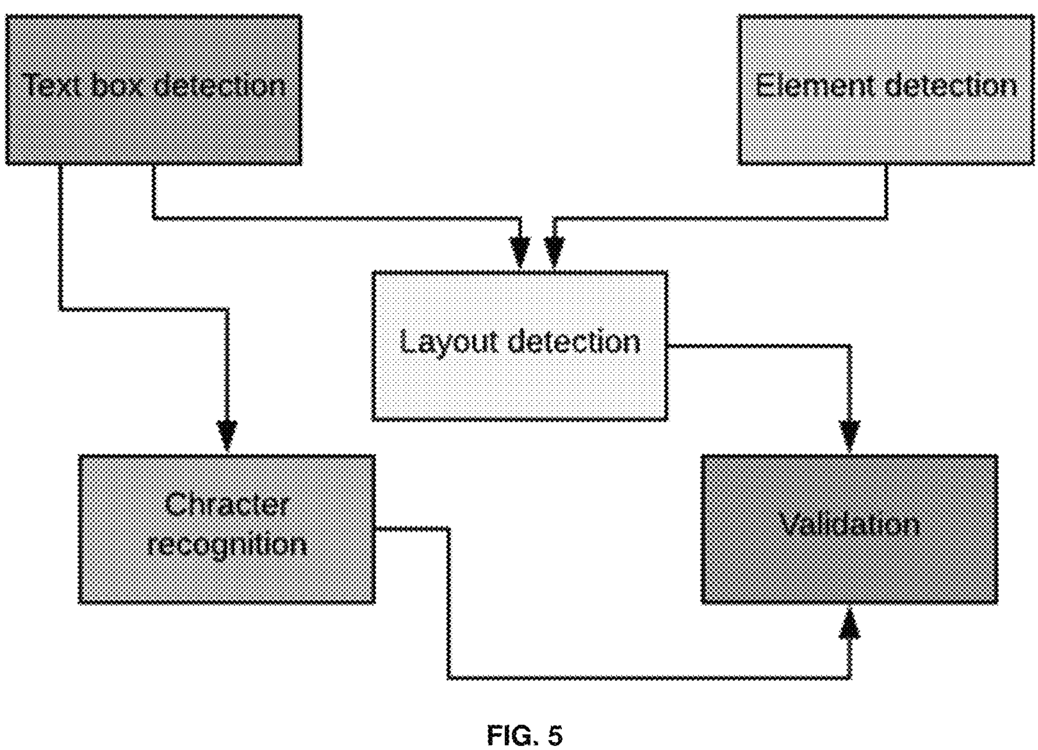
FIG. 5 is a schematic showing the architecture of a computer vision system for analyzing a web application user interface.

In some embodiments, components of system embodiments interact (e.g., communicate, transmit data and/or instructions) according to a system architecture, e.g., as shown in FIG. 5. For example, in some embodiments, the TBD component interacts with the LD component and/or the OCR component; the ED component interacts with the LD component; and the OCR component and/or the LD component interact with the TV component. In some embodiments, the communication flow is unidirectional, e.g., as shown in FIG. 5. For example, in some embodiments, data and/or instructions are communicated from the TBD component to the LD component and/or the OCR component; data and/or instructions are communicated from the ED component to the LD component; and data and/or instructions are communicated from the OCR component and/or the LD component to the TV component. In some embodiments, data and/or instructions move bidirectionally among these components according to the system architecture described herein. In some embodiments, each component (e.g., a text box detection (TBD) component, a character recognition (OCR) component, an element detection (ED) component, a layout detection (LD) component, and/or a template verification (TV) component) in configured to provide and/or to receive information and/or data from another component according to the system architecture. In some embodiments, the system architecture outputs text attributes and/or attribute values that are used as input into a method and/or system component for producing an element definition as described herein and/or an element match score as described herein.

In some embodiments, each module is configured to perform machine learning and/or deep learning to perform its function. For example, in some embodiments, a document template validation (DTV) technology comprises a text box detection (TBD) component configured to perform a method comprising detecting a text box using machine learning and/or deep learning, a character recognition (OCR) component configured to perform a method comprising recognizing characters using machine learning and/or deep learning, an element detection (ED) component configured to perform a method comprising detecting an element using machine learning and/or deep learning, a layout detection (LD) component configured to perform a method comprising detecting a layout using machine learning and/or deep learning, and/or a template verification (TV) component configured to perform a method comprising verifying a template using machine learning and/or deep learning.

In some embodiments, the technology provides systems and methods for detecting a text box on a software application (e.g., a web application (e.g., a web page)) application UI. In some embodiments, detecting a text box comprises identifying the location and/or dimensions of a text box on a web application UI. In some embodiments, detecting a text box comprises producing values describing the location (e.g., in x-y screen coordinates and/or in x-y coordinates relative to a window or element comprising the text box) and/or dimensions (e.g., as a height and width) of a text box on a web application UI. In some embodiments, a text box and/or values describing the location and dimensions of a text box on a web application UI is/are passed to a character recognition module.

In some embodiments, detecting a text box comprises providing and/or using a neural network to detect text in an image (e.g., a screen image). In some embodiments, a component configured to detect text is configured to use a neural network to detect text in an image (e.g., a screen image). See, e.g., FIG. 6. In some embodiments, the technology provided herein comprises a neural network as described in Baek (2019) "Character Region Awareness for Text Detection" arXiv:1904.01941 [cs.CV], incorporated herein by reference. In some embodiments, the neural network comprises an architecture as shown in Baek at FIG. 2 therein, incorporated herein by reference. In some embodiments, the neural network comprises a central convolutional architecture based on VGG-16 with batch normalization (see, e.g., Simonyan (2018) "Very Deep Convolutional Networks for Large-Scale Image Recognition" arXiv: 1409.1556 [cs.CV], incorporated herein by reference). In some embodiments, the neural network comprises skip connections (e.g., a decoding component of the neural network comprises skip connections). In some embodiments, the skip connections are similar to U-net (see, e.g., Ronneberger (2015) "U-Net: Convolutional Networks for Biomedical Image Segmentation" arXiv:1505.04597 [cs.CV], incorporated herein by reference). In some embodiments, methods and/or systems for text box detection (e.g., comprising a neural network) produce an output comprising two channels as score maps: 1) a region score used to localize individual characters in the image; and 2) an affinity score used to group each character into a single instance (e.g., into a character string (e.g., a character string comprising a word or a phrase)). In some embodiments, a character string is a text attribute provided to a method and/or a system component for producing an element definition and/or an element match score as described herein.

In some embodiments, the technology provides methods and systems for detecting an element on a software application (e.g., a web application (e.g., a web page)) UI. In some embodiments, methods for detecting an element on a software application (e.g., a web application (e.g., a web page)) UI comprises grouping text boxes and detecting objects that are not in the text category (e.g., detecting non-text category objects (e.g., buttons, input boxes, icons, etc.)) In some embodiments, systems for detecting an element on a software application (e.g., a web application (e.g., a web page)) UI comprise a component configured to group text boxes and a component configured to detect objects that are not in the text category (e.g., detect non-text category objects (e.g., buttons, input boxes, icons, etc.)). In some embodiments, methods for element detection comprise detecting text boxes and/or elements comprising grouped text boxes. In some embodiments, methods for element detection comprise detecting objects (e.g., non-text box objects). In some embodiments, systems for element detection comprise a component configured to detect text boxes and/or elements comprising grouped text boxes. In some embodiments, systems for element detection comprise a component configured to detect objects (e.g., non-text box objects).

In some embodiments, detecting an element comprises identifying the location and/or dimensions of an element on a software application (e.g., a web application (e.g., a web page)) UI, e.g., by analysis of the visual render of a UI to identify elements on the UI and/or to identify attributes and/or attribute values of elements on the UI. In some embodiments, detecting an element comprises producing values describing the location (e.g., in x-y screen coordinates and/or in x-y coordinates relative to a window or element comprising the element) and/or dimensions (e.g., as a height and width) of an element on a software application (e.g., a web application (e.g., a web page)) UI. In some embodiments, an element and/or values describing the location and dimensions of an element on a software application (e.g., a web application (e.g., a web page)) UI is/are passed to a character recognition module.

In some embodiments, an element of the UI comprises grouped text boxes. In some embodiments, the technology represents a text box by a vector u=(x, y, w, h), where x and y represent the pixel position in the document screenshot or viewport and w and h represent the width and height of the box. In some embodiments, a distance between text boxes is determined. In some embodiments, a distance between text boxes is determined using a method perform by a function encoded in software. In some embodiments, a distance between text boxes is determined using a function encoded as follows:

```
def block_distance (u, v):
  if u[0] > v[0]:
    dx = u[0] − (v[0]+v[2])
  else:
    dx = v[0] − (u[0] + u[2])
  if u [1] > v [1] :
    dy = u[1] − (v[1] +v[3])
  else:
    dy = v[1] − (u[1] + u[3])
  dx = 0 if dx < 0 else dx
  dy = 0 if dy < 0 else dy
  return np.fabs (dx) + np.fabs (dy)
```

where in this function u and v are two vectors whose elements are defined as u=(x, y, w, h). In some embodiments, the distance between text boxes is provided to a method for density-based clustering that groups text boxes and outputs clusters of text boxes (see, e.g., FIG. 7 and FIG. 8). In some embodiments, the density-based clustering that groups text boxes produces clusters of text boxes, e.g., to identify an element and/or to identify text attributes and/or attribute values to assign to an element.

Figure 9:
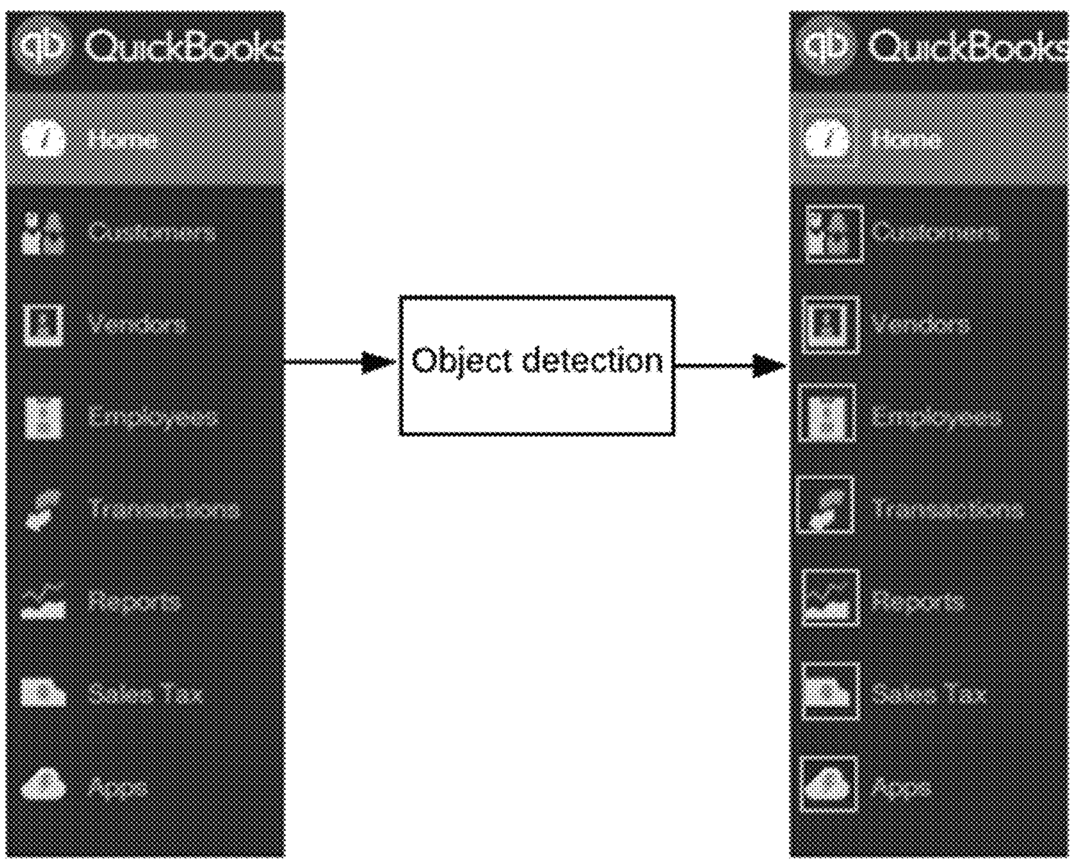
FIG. 9 shows a schematic of exemplary input web application processed by an object detection technology and exemplary output produced by the object detection technology.

In some embodiments, the technology provides methods and systems for detecting an object on a web application UI. See, e.g., FIG. 9. In some embodiments, a method for element detection comprises a step of object detection. In some embodiments, methods and systems for element and/or object detection comprise analysis of the visual render of a UI. In some embodiments, detecting an object comprises identifying the location and/or dimensions of an object on a software application (e.g., web application (e.g., web page)) UI. In some embodiments, detecting an object comprises producing values describing the location (e.g., in x-y screen coordinates and/or in x-y coordinates relative to a window or element comprising the object) and/or dimensions (e.g., as a height and width) of an object on a software application (e.g., web application (e.g., web page)) UI. In some embodiments, an object and/or values describing the location and dimensions of an object on a software application (e.g., web application (e.g., web page)) UI is/are passed to a character recognition module. In some embodiments, an object, and/or values describing the location and dimensions of an object on a software application (e.g., web application (e.g., web page)) UI is/are passed to a module for determining element context as described herein (e.g., a combination statistical model as described herein).

In some embodiments, a system comprising a component configured to detect an element comprises a sub-component configured to detect an object. In some embodiments, methods for detecting an object on a software application (e.g., web application (e.g., web page) UI comprises providing and/or using a YOLO neural network. In some embodiments, systems for detecting an object on a web application UI comprises a YOLO neural network (see, e.g., Redmon (2015) "You Only Look Once: Unified, Real-Time Object Detection" arXiv:1506.02640 [cs.CV]; Redmon (2016) "YOLO9000: Better, Faster, Stronger" arXiv:1612.08242 [cs.CV]; and Redmon (2018) "YOLOv3: An Incremental Improvement" arXiv: 1804.02767 [cs.CV], each of which is incorporated herein by reference). In some embodiments, the neural network is trained to identify non-text objects, e.g., icons, buttons, and/or square input boxes. In some embodiments, the neural network comprises an icon classifier trained with a dataset of icons. In some embodiments, the icon classifier identifies and/or classifies an icon as a cart icon, arrow icon, open file icon, save file icon, login icon, checked icon, bullet icon, and/or close icon.

Code Analysis

In some embodiments, the technology comprises analyzing computer software (e.g., source code and/or object code associated with a software application (e.g., web application (e.g., web page))). In some embodiments, the technology comprises analyzing source code and/or object code without running the web application. In some embodiments, the technology comprises analyzing source code and/or object code while the web application is running. In some embodiments, natural language processing is used to analyze source and/or object code to identify and associate actions with interface elements (e.g., identified by computer vision and/or by analysis of source code). In some embodiments, the code produces an element on a software application (e.g., a web application (e.g., web page)) UI. In some embodiments, code analysis produces element code data that is used to produce an element definition. In some embodiments, producing an element definition comprises using element code data produced by and/or acquired from analyzing code. In some embodiments, producing an element definition comprises using element code data produced by and/or acquired from a component configured to analyze code. In some embodiments, code analysis is used to determine element attributes and/or attribute values and assign element attributes and/or attribute values to an element. In some embodiments, element attributes and/or attribute values determined using code analysis are provided to a method and/or a system component for producing an element definition and/or an element match score using the element attributes and/or attribute values.

Classifiers and Models

In some embodiments, data (e.g., element attributes and/or attribute values, statistical values and/or parameters calculated from element attribute values, and/or characteristics of distributions of element attribute values) are analyzed by algorithms that recognize patterns and regularities in data, e.g., using artificial intelligence, pattern recognition, machine learning, statistical inference, neural nets, etc. In some embodiments, pattern recognition systems are trained using known training data (e.g., using supervised learning) and in some embodiments algorithms are used to discover previously unknown patterns (e.g., unsupervised learning). See, e.g., Duda, et al. (2001) *Pattern classification* (2nd edition), Wiley, New York; Bishop (2006) *Pattern Recognition and Machine Learning*, Springer, each of which is incorporated herein by reference.

In some embodiments, the technology comprises a classifier based on a statistical model. In some embodiments, the technology comprises use of a generative model. In some embodiments, the technology comprises use of a discriminative model. In some embodiments, the technology comprises use of a linear combination of a generative and a discriminative model. See, e.g., FIG. 1. In some embodiments, methods and systems for determining element context comprises using a statistical model. In some embodiments, determining element context comprises use of a generative model. In some embodiments, determining element context comprises use of a discriminative model. In some embodiments, determining element context comprises use of a linear combination of a generative and a discriminative model. See, e.g., FIG. 1. In some embodiments, the element context is used as an input into a method and/or a system component for producing an element definition and/or an element match score.

In some embodiments, the technology provides a system comprising a classifier component, e.g., configured to assign element attributes and/or attribute values to elements and/or to assign element context attributes and/or attribute values to elements (e.g., to determine distributions of attribute values, spatial relationships among elements, etc.) In some embodiments, the classifier component comprises a machine learning component (e.g., a neural net) that is trained to identify elements, identify element attributes and/or attribute values, assign element attributes and/or attribute values to elements, determine the context of an element (e.g., determine the neighbors of an element, determine distributions of attribute values, determine relative spatial relationships among elements, etc.)

In some embodiments, determining element context comprises use of a classifier that is implemented as a linear classifier (e.g., linear support vector machine classifier, least squares classifier, perceptron classifier, linear regression classifier, logistic regression classifier, naive Bayes classifier, linear discriminant analysis (LDA) classifier, etc.), a nonlinear classifier (e.g., nonlinear support vector machine classifier, neural network classifier, etc.), a kernel classifier, a decision tree classifier, and/or other suitable type of classifier. In some embodiments, determining element context comprises use of a classifier component comprising and/or configured to perform one or more machine learning techniques (e.g., supervised, semi-supervised, unsupervised, and/or combination thereof) based on probabilistic and/or statistical-based models including, for example: generative models (e.g., Hidden Markov Model (HMM), naive Bayes. probabilistic context free grammars, etc.), discriminative models (e.g., support vector machine, conditional random fields, decision trees, neural networks, linear regression, and the like), and/or a combination thereof.

A generative model is a statistical model of the joint probability distribution P(X,Y) given an observable variable X (e.g., a data set) and a target variable Y (e.g., one or more classes). Exemplary generative models include, e.g., mixture models (e.g., Gaussian mixture models), hidden Markov models, probabilistic context-free grammars, Bayesian networks (e.g., naive Bayesian networks, autoregressive models), averaged one-dependence estimators, Latent Dirichlet allocation models, Boltzmann machines (e.g. restricted Boltzmann machines, deep belief networks), variational autoencoders, generative adversarial networks, and/or a flow-based generative models. In some embodiments, the technology comprises a classifier based on a generative model, e.g., a generative classifier. Exemplary generative classifiers include, e.g., a naive Bayes classifier and linear discriminant analysis.

A discriminative model is a model of the conditional probability of the target variable Y (e.g., class), given an observation x (e.g., a measurement (e.g., datum)), e.g., P(Y|X)=x. Exemplary discriminative models include, e.g., k-nearest neighbors algorithm models, logistic regression models, support vector machines, maximum-entropy Markov models, conditional random fields, and/or neural networks. In some embodiments, the technology comprises a classifier based on a discriminative model, e.g., a discriminative classifier. Exemplary discriminative classifiers include, e.g., classifiers based on logistic regression and non-model classifiers (e.g., perceptron. support vector machine, etc.) See, e.g., Jebara (2004) *Machine Learning: Discriminative and Generative*. The Springer International Series in Engineering and Computer Science (Springer US), incorporated herein by reference.

Accordingly, in some embodiments, the technology provides determining element context using a discriminative classifier that comprises data and operations for that data to distinguish between two or more classes or classifications (e.g., the classifier receives data as an input and assigns a class to data as an output). In some embodiments, the technology provides a generative classifier that assigns classes to data using a probabilistic or statistical distribution of input data and assignments of classes to the data (e.g., the classifier generates sample data that is a member of a class). In some embodiments, a discriminative classifier determines to which class a sample (or input data or collection of data) belongs by modeling the differences between and/or among the classes and a generative classifier provides a description or approximation of members of classes. Thus, a generative model defines (or approximates with a statistical probability) data-class relationships and a discriminative classifier describes differences between two or more classes that are used to sort data into classes.

Comparison Component

In some embodiments, the technology comprises a comparison component. In some embodiments, the comparison component accepts as input a first graphical model and a second graphical model and generates as output a graphical model difference model. The graphical model difference model comprises element difference entries that identify elements having attributes and/or attribute values that have changed from the first graphical model and the second graphical model. In some embodiments, the graphical model difference model comprises element sameness entries that identify elements having attributes and/or attribute values that have not changed from the first graphical model and the second graphical model. Accordingly, in some embodiments, the graphical model difference model comprises entries that identify elements having some attributes and/or attribute values that have changed from the first graphical model and the second graphical model and having some attributes and/or attribute values that have not changed from the first graphical model and the second graphical model. In some embodiments, a plurality of graphical models describing a plurality of versions of a web application UI are compared and differences are identified. In some embodiments, probabilistic models (e.g., hidden Markov models) are used to assign probabilities of changes for elements and/or regions of a screen based on the comparisons of the plurality of graphical models.

Accordingly, in some embodiments, the technology comprises a graphical modeling component configured to produce a graphical model; and a graphical model comparison component. In some embodiments, the graphical modeling component accepts a web application (e.g., comprising a UI) having a version N (e.g., "application vN") and creates a vN graphical model. In some embodiments, the graphical modeling component accepts a web application (e.g., comprising a UI) having a version N+1 (e.g., "application vN+1") and creates a vN+1 graphical model. In some embodiments, the graphical model comparison component accepts the vN graphical model and the vN+1 graphical model to produce a graphical model difference model. In some embodiments, The vN graphical model is a model of a first version of a web application and the vN+1 graphical model is a model of a subsequent version of the web application.

In some embodiments, the graphical modeling component accepts a plurality of versions of a web application (e.g., comprising a UI) having version numbers N, N+1, . . . , N+X (e.g., "application vN", "application vN+1", . . . , "application vN+X") and creates a vN graphical model, a vN+1 graphical model, . . . , and a vN+X graphical model. In some embodiments, the graphical model comparison component accepts the vN graphical model, the vN+1 graphical model, . . . , and the vN+X graphical model to produce a graphical model difference model.

In some embodiments, a probabilistic model is used to analyze the graphical model difference model to identify elements in a UI. In some embodiments, a probabilistic model is used to analyze the graphical model difference model to identify regions of a screen, page, window, and/or parent element. In some embodiments, a probabilistic model is used to analyze the graphical model difference model to score elements according to their probability of being a target element for a test case. In some embodiments, a probabilistic model is used to analyze the graphical model difference model to rank regions of a screen, page, window, and/or parent element that have a high probability of comprising a target element for a test case. In some embodiments, the ranked list of elements is used to provide output to a user of elements that are likely to be target element of a test case. In some embodiments, the ranked list of elements is used to identify elements that are target elements and, in some embodiments, the ranged list is used to identify problems in a test case and/or software failures.

In some embodiments, the technology comprises producing an element definition model that describes the attributes and/or attribute values (e.g., element render data, the element text data, the element code data, and/or the element context data) of elements on a web application UI. In some embodiments, the technology comprises producing a plurality of element definition models (e.g., a first element definition model, a second element definition model, . . . ) for a plurality of versions of a web application UI (e.g., a first version, a second version, . . . ). In some embodiments, the comparison component accepts as input a first element definition model and a second element definition model and generates as output an element definition model difference model. The element definition model difference model comprises element definition difference entries that identify elements having element definitions that have changed from the first element definition model and the second element definition model. In some embodiments, the element definition model difference model comprises element definition sameness entries that identify elements having element definitions that have not changed from the first element definition model and the second element definition model. Accordingly, in some embodiments, the element definition model difference model comprises entries that identify elements having element definitions that have changed from the first element definition model and the second element definition model and having some element definitions that have not changed from the first element definition model and the second element definition model. In some embodiments, a plurality of element definition models describing a plurality of versions of a web application UI are compared and differences are identified. In some embodiments, probabilistic models (e.g., hidden Markov models) are used to assign probabilities of changes for elements and/or regions of a screen based on the comparisons of the plurality of element definition models.

Accordingly, in some embodiments, the technology comprises an element definition modeling component configured to produce an element definition model; and an element definition model comparison component. In some embodiments, the element definition modeling component accepts a web application (e.g., comprising a UI) having a version N (e.g., "application vN") and creates a vN element definition model. In some embodiments, the element definition modeling component accepts a web application (e.g., comprising a UI) having a version N+1 (e.g., "application vN+1") and creates a vN+1 element definition model. In some embodiments, the element definition model comparison component accepts the vN element definition model and the vN+1 element definition model to produce an element definition model difference model. In some embodiments. The vN element definition model is a model of a first version of a web application and the vN+1 element definition model is a model of a subsequent version of the web application.

In some embodiments, the element definition modeling component accepts a plurality of versions of a web application (e.g., comprising a UI) having version numbers N, N+1, . . . , N+X (e.g., "application vN", "application vN+1", . . . , "application vN+X") and creates a vN element definition model, a vN+1 element definition model, . . . , and a vN+X element definition model. In some embodiments, the element definition model comparison component accepts the vN element definition model, the vN+1 element definition model, . . . , and the vN+X element definition model to produce an element definition model difference model.

In some embodiments, a probabilistic model is used to analyze the element definition model difference model to identify elements of the web application. In some embodiments, a probabilistic model is used to analyze the element definition model difference model to identify regions of a screen, page, window, and/or parent element of the web application. In some embodiments, a probabilistic model is used to analyze the element definition model difference model to rank elements according to their probability of being a target element of a test case or a step of a test case. In some embodiments, a probabilistic model is used to analyze the element definition model difference model to rank regions of a screen, page, window, and/or parent element that have a high probability of comprising a target element of a test case or a step of a test case. In some embodiments, the ranked list of elements is used to provide output to a user of the likelihood of an element being a target element for a test case or a step of a test case. In some embodiments, the ranked list of elements is used to identify target elements and/or to identify problems in a test case and/or software failures.

In some embodiments, comparison is performed using a probabilistic model to identify differences between versions of a web application UI (e.g., by identifying differences between models (e.g., graphical and/or element definition models describing versions of a UI)). In some embodiments, the comparison component is configured to provide and/or evaluate a probabilistic model, accept inputs for the probabilistic model, and/or produce outputs from the probabilistic model. In some embodiments, the probabilistic model is a statistical model comprising statistical assumptions, mathematical relationships between pairs of variables, rules, and/or weights associated with data and/or mathematical relationships and/or assumptions. In some embodiments, the probabilistic model is a statistical model that receives as inputs statistical assumptions, mathematical relationships between pairs of variables, rules, and/or weights associated with data and/or mathematical relationships and/or assumptions. In some embodiments, the probabilistic model is a statistical model that identifies and/or produces statistical assumptions, mathematical relationships between pairs of variables, rules, and/or weights associated with data and/or mathematical relationships and/or assumptions by receiving training set data, producing models characterizing the training set data, and evaluating the models characterizing the training set data. In some embodiments, the probabilistic model outputs a probability that an element is a target element. In some embodiments, the probabilistic model is a hidden Markov model (e.g., the model assumes the model describes a Markov system). See, e.g., Baum (1966) "Statistical Inference for Probabilistic Functions of Finite State Markov Chains" The Annals of Mathematical Statistics 37: 1554-63: Baum (1967) "An inequality with applications to statistical estimation for probabilistic functions of Markov processes and to a model for ecology" Bulletin of the American Mathematical Society 73: 360: Baum, (1968) "Growth transformations for functions on manifolds" Pacific Journal of Mathematics 27: 211-27: Baum (1970) "A Maximization Technique Occurring in the Statistical Analysis of Probabilistic Functions of Markov Chains" The Annals of Mathematical Statistics 41: 164-71: and Baum (1972) "An Inequality and Associated Maximization Technique in Statistical Estimation of Probabilistic Functions of a Markov Process" Inequalities 3: 1-8. each of which is incorporated herein by reference. In some embodiments, the probabilistic model comprises use of conditional random fields. In some embodiments, the probabilistic model comprises use of Markov random fields. See, e.g., Kindermann (1980) *Markov Random Fields and Their Applications*, Contemporary Mathematics, 1. American Mathematical Society, Providence, R.I.; Li (2009) *Markov Random Field Modeling in Image Analysis*, Springer, 3rd ed, (editor Sameer Singh): and Lauritzen (1996) *Graphical models*, Oxford, Clarendon Press, page 33 et seq., each of which is incorporated herein by reference.

Hardware

In some embodiments, the technology provided herein is implemented by one or more special-purpose computing devices. In some embodiments, the special-purpose computing devices are hard wired to perform embodiments of the technology and, in some embodiments, hardware comprises digital electronic devices such as one or more application-specific integrated circuits (ASICs) or field programmable gate arrays (FPGAs) that are persistently programmed to perform embodiments of the technology. In some embodiments, hardware comprises one or more general purpose hardware processors programmed to perform embodiments of the technology based on program instructions in firmware, memory, other storage, or a combination. In some embodiments, special-purpose computing devices comprise custom hard-wired logic, ASICs, and/or FPGAs and use of custom programming to accomplish embodiments of the technology. In some embodiments, special-purpose computing devices are, e.g., desktop computer systems, portable computer systems, handheld devices, networking devices, or any other device that incorporates hard-wired and/or program logic to implement the techniques.

In some embodiments, the technology comprises use of a computer system. In some embodiments, a computer system comprises a bus or other component configured to communicate information and a hardware processor coupled with the bus for processing information. In some embodiments, the hardware processor is a general-purpose microprocessor. In some embodiments, the computer system comprises a main memory, such as a random access memory (RAM) or other dynamic storage device, coupled to the bus for storing information and instructions to be executed by the processor. In some embodiments, the main memory is used for storing temporary variables or other intermediate information during execution of instructions to be executed by the processor. In some embodiments, instructions (e.g., stored in non-transitory storage media accessible to the processor) are provided to a computer system to provide a special-purpose machine that is customized to perform the operations specified in the instructions. In some embodiments, the computer system comprises a read only memory or other static storage device coupled to the bus for storing static information and instructions for the processor. In some embodiments, a storage device, such as a magnetic disk, optical disk, or solid-state drive, is provided and coupled to the bus for storing information and instructions. In some embodiments, the computer system is coupled by the bus to a display, such as a cathode ray tube (CRT), liquid crystal display (LCD), or other display technology known in the art, for displaying information to a computer user. In some embodiments, an input device (e.g., including alphanumeric and other keys) is coupled to the bus for communicating information and command selections to the processor. In some embodiments, other types of user input devices that find use for cursor control include, e.g., a mouse, a trackball, or cursor direction keys for communicating direction information and command selections to the processor and for controlling cursor movement on the display. Input devices typically have two degrees of freedom in two axes, a first axis (e.g., x) and a second axis (e.g., y), that allows the device to specify positions in a plane.

In some embodiments, the computer system implements embodiments of the technology described herein using customized hard-wired logic, one or more ASICs or FPGAs, firmware, and/or program logic that, in combination with the computer system, causes or programs the computer system to be a special-purpose machine. In some embodiments, methods described herein are performed by a computer system in response to a processor executing one or more sequences of one or more instructions contained in main memory. In some embodiments, instructions are read into main memory from another storage medium, such as a storage device. In some embodiments, execution of the sequences of instructions contained in main memory causes a processor to perform the process steps described herein. In some embodiments, hard-wired circuitry is used in place of or in combination with software instructions.

As used herein, the term "storage media" refers to any non-transitory media that store data and/or instructions that cause a machine to operate in a specific fashion. Such storage media may include non-volatile media and/or volatile media. Non-volatile media includes, for example, storage devices (e.g., optical disks, magnetic disks, or solid-state drives). Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge. Storage media is distinct from but may be used in conjunction with transmission media. Transmission media participates in transferring information between storage media. For example, transmission media includes coaxial cables, copper wire and fiber optics, including the wires that include a bus. Transmission media can also take the form of acoustic or light waves, such as those generated during radio-wave (e.g., IEEE 802.11) and infra-red data communications. Transmission media also includes the Internet, WAN, and LAN.

In some embodiments, various forms of media carry one or more sequences of one or more instructions to a processor for execution. For example, the instructions may initially be carried on a magnetic disk or solid-state drive of a remote computer. The remote computer can load the instructions into its dynamic memory and send the instructions over a transmission medium. A local computer system can receive the data on the transmission medium and appropriate circuitry can place the data on a bus. The bus carries the data to main memory, from which a processor retrieves and executes the instructions. The instructions received by main memory may optionally be stored on a storage device either before or after execution by the processor. In some embodiments, a computer system comprises a communication interface coupled to the bus. In some embodiments, a communication interface provides a two-way data communication coupling to a network link that is connected to a local network. For example, a communication interface may be an integrated services digital network (ISDN) card, cable modem, satellite modem, ethernet card, wireless radio, or a modem to provide a data communication connection to a corresponding type of telephone line. As another example, a communication interface may be a local area network (LAN) card to provide a data communication connection to a compatible LAN. Wireless links may also be implemented. In any such implementation, the communication interface sends and receives electrical, electromagnetic, or optical signals that carry digital data streams representing various types of information.

In some embodiments, a network link provides data communication through one or more networks to other data devices. For example, a network link may provide a connection through a local network to a host computer or to data equipment operated by an Internet Service Provider (ISP). An ISP in turn provides data communication services through the world wide packet data communication network now commonly referred to as the "Internet". A local network and the Internet both use electrical, electromagnetic, or optical signals that carry digital data streams. The signals through the various networks and the signals on the network link and through the communication interface, which carry the digital data to and from a computer system, are example forms of transmission media.

In some embodiments, the computer system sends messages and receives data, including program code, through the network(s), network link, and communication interfaces. For example, a server can transmit a requested code for an application program through the Internet, ISP, local network, and communication interface. In some embodiments, the received code is executed by a processor as it is received and/or stored in a storage device or other non-volatile storage for later execution.

In some embodiments, any of these hardware components are provided as a virtual component using emulation and/or cloud computing. Accordingly, as used herein, the term "hardware" and components of hardware described herein also refer to local or remote physical hardware or hardware and/or hardware components that are provided by emulation on as one or a plurality of virtual machines in a cloud environment.

In various embodiments, aspects the described subject matter may be implemented by computer-executable instructions, e.g., stored on one or more computer-readable storage media described herein and/or known in the art. Computer-executable instructions may be implemented using any various types of suitable programming and/or markup languages such as: Extensible Application Markup Language (XAML), XML, XBL HTML, XHTML, XSLT, XMLHttpRequestObject, CSS, Document Object Model (DOM), JAVA, JavaScript, JavaScript Object Notation (JSON), Jscript, ECMAScript, Ajax, FLASH, SILVERLIGHT, VISUAL BASIC (VB), VBScript, PHP, ASP, SHOCKWAVE, Python, PERL, C, Objective-C, C++, C#/.net, Swift, SmallTalk. and/or others.

Although the disclosure herein refers to certain illustrated embodiments, it is to be understood that these embodiments are presented by way of example and not by way of limitation.

EXAMPLES

Example 1—Attribute Stability

During the development of embodiments of the technology provided herein, the technology was used to evaluate the stability of element attributes for several attribute types. See, e.g., FIGS. 14A to 14G. Code scoring (e.g., as described herein and as shown in FIG. 12) was used to identify elements and assign values of element attributes to elements. The code scoring determined the values ("states") of the UNIQUESELECTORS, ATTR_CLASS, ATTR_TYPE, CSSSELECTOR, TYPE, ATTR_PARENT_INDEX, ATTR_ALT, ATTR_PARENT_Y, XPATH, TEXT, ATTR_MAXLENGTH, ATTR_PARENT_X, ATTR_PARENT_VALUE, ATTR_AUTOFOCUS, ATTR_SRC, ELEMENT, VALUE, TIMESTAMP, XPATH5, XPATH2, ATTR_NAME, INDEX, CSSSELECTOR2, XPATH4, ATTR_PARENTMETHOD, ATTR_PARENTCLASS, XPATH3, ATTR_ID, ATTR_PARENT_TEXT, ATTR_PARENTACTION, X, UNIQUESELECTORS2, Y, FORMDATA, ATTR_PARENTID, ATTR_PLACEHOLDER, SECONDARYSELECTORS, and ATTR_PARENT_ELEMENT attributes for a plurality of versions of a web application. The number of times each value ("state") was detected for each attribute was used to produce histograms showing the distributions for the values that each attribute had over the plurality of versions of the web application. Exemplary histograms are shown in FIGS. 14A to 14G. The distributions of the values are used to predict the probability that an attribute will have a value according to the detected states.

Figure 14A:
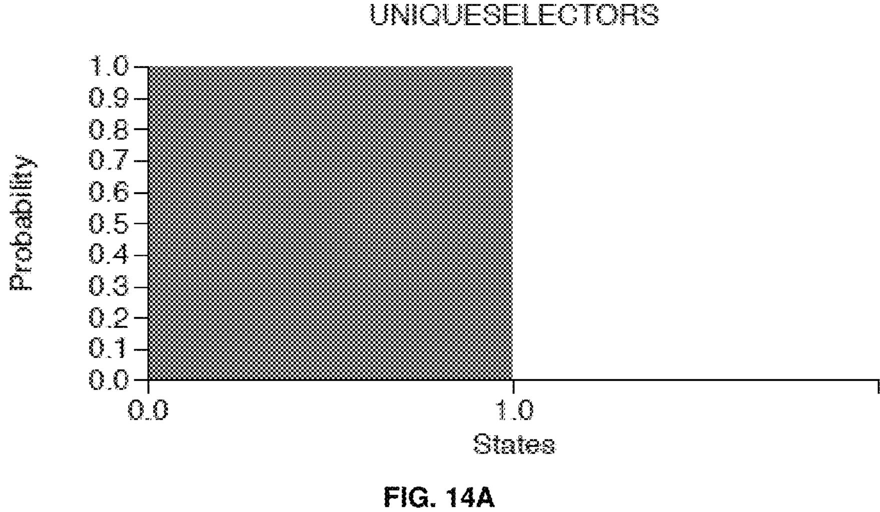
FIG. 14A is a histogram showing the probability distribution for the "UNIQUESELECTORS" attribute over the values detected for the attribute for a plurality of versions of the attribute.
Figure 14B:
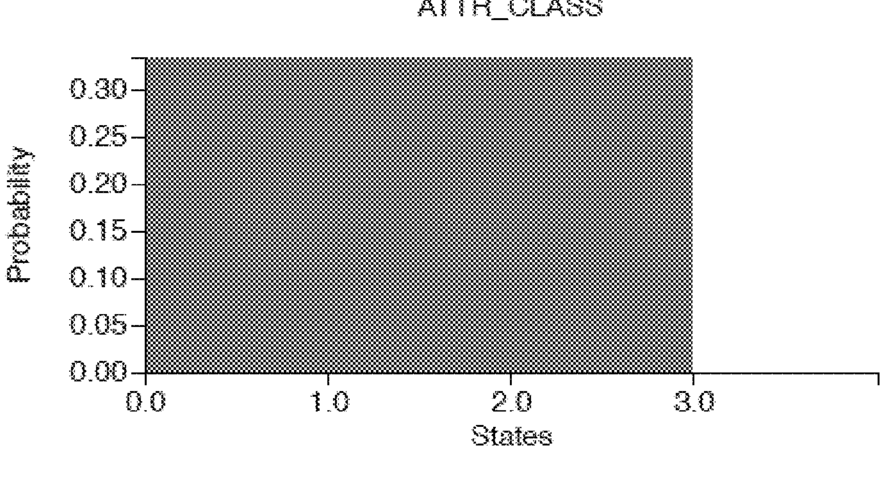
FIG. 14B is a histogram showing the probability distribution for the "ATTR_CLASS" attribute over the values detected for the attribute for a plurality of versions of the attribute.
Figure 14C:
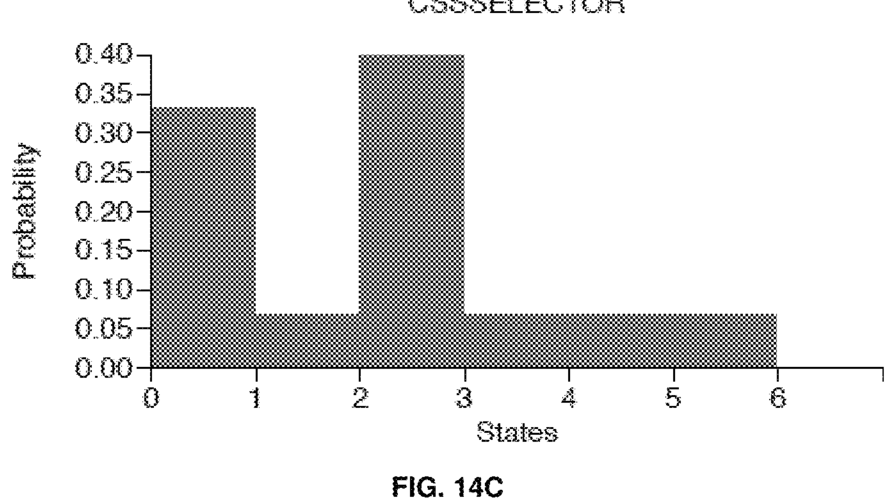
FIG. 14C is a histogram showing the probability distribution for the "CSSSELECTOR" attribute over the values detected for the attribute for a plurality of versions of the attribute.
Figure 14D:
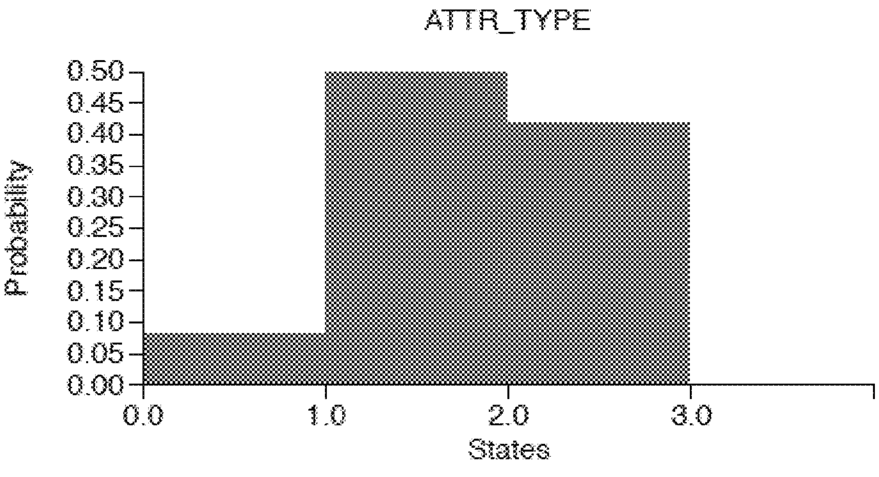
FIG. 14D is a histogram showing the probability distribution for the "ATTR_TYPE" attribute over the values detected for the attribute for a plurality of versions of the attribute.
Figure 14E:
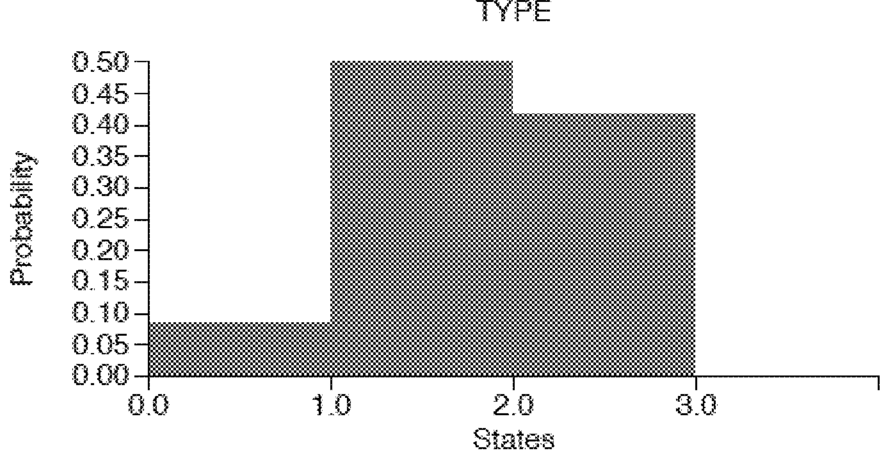
FIG. 14E is a histogram showing the probability distribution for the "TYPE" attribute over the values detected for the attribute for a plurality of versions of the attribute.
Figure 14F:
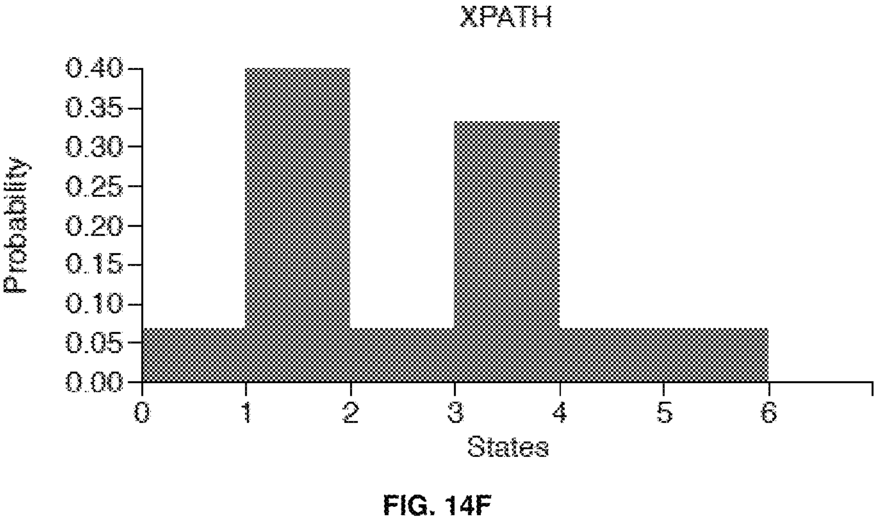
FIG. 14F is a histogram showing the probability distribution for the "XPATH" attribute over the values detected for the attribute for a plurality of versions of the attribute.
Figure 14G:
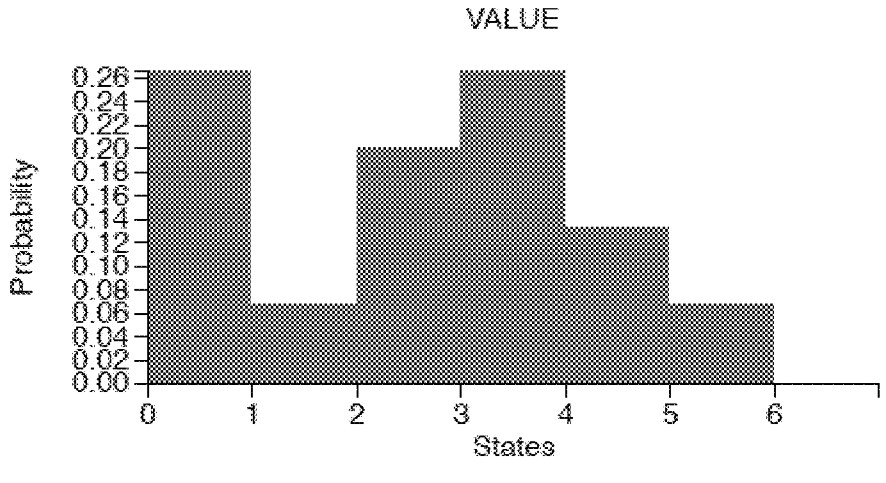
FIG. 14G is a histogram showing the probability distribution for the "VALUE" attribute over the values detected for the attribute for a plurality of versions of the attribute.

For example, as shown in FIG. 14A, the UNIQUESELECTORS attribute had the same value (according to a first state) in every version of the web application evaluated. Thus, the UNIQUESELECTORS attribute is predicted to have a value according to the first state with a probability of 1.0. As shown in FIG. 14B, the ATTR_CLASS attribute had three different values over the plurality of versions of the web application with the same frequency for each of the three values. Thus, the ATTR_CLASS attribute is predicted to have a value according to the first, second, or third states with the same probability (e.g., approximately 0.33). Exemplary histograms for CSSSELECTOR, ATTR_TYPE, TYPE, XPATH, and VALUE are shown in FIGS. 14C-14G.

The histograms show the likelihood that an attribute will have a particular value and, accordingly, show the stability of the attribute value. An attribute that has a significant probability of having a different value between versions of a web application UI has a low (e.g., 0) stability (e.g., the ATTR_CLASS attribute in this example). An attribute that has a significant probability of having the same value between versions of a web application UI has a high (e.g., 1) stability (e.g., the UNIQUESELECTORS attribute in this example). In some embodiments, the standard deviation of the distribution is used to determine the stability of the attribute over versions of a web application. In some embodiments, the information provided by an attribute or an element is determined by calculating the information entropy (S) associated with each possible attribute value (i), e.g., according to an equation in which information is the negative logarithm of the probability mass function for the value:

$$S = -\sum_i P_i \log P_i$$

where $P_i$ is the probability of attribute values indexed over i. Accordingly, when an attribute has a low-probability value, the element having the attribute provides more information than when the attribute has a high probability value. In some embodiments, element attributes that are more stable are given a higher weighting when used in producing an element definition (e.g., as shown in FIG. 4) and/or a target element match score. In some embodiments, elements providing more information are given a higher weighting when determining the context of an element (e.g., as described herein and shown in FIG. 13).

Example 2—Test Case Intent

Figure 15:
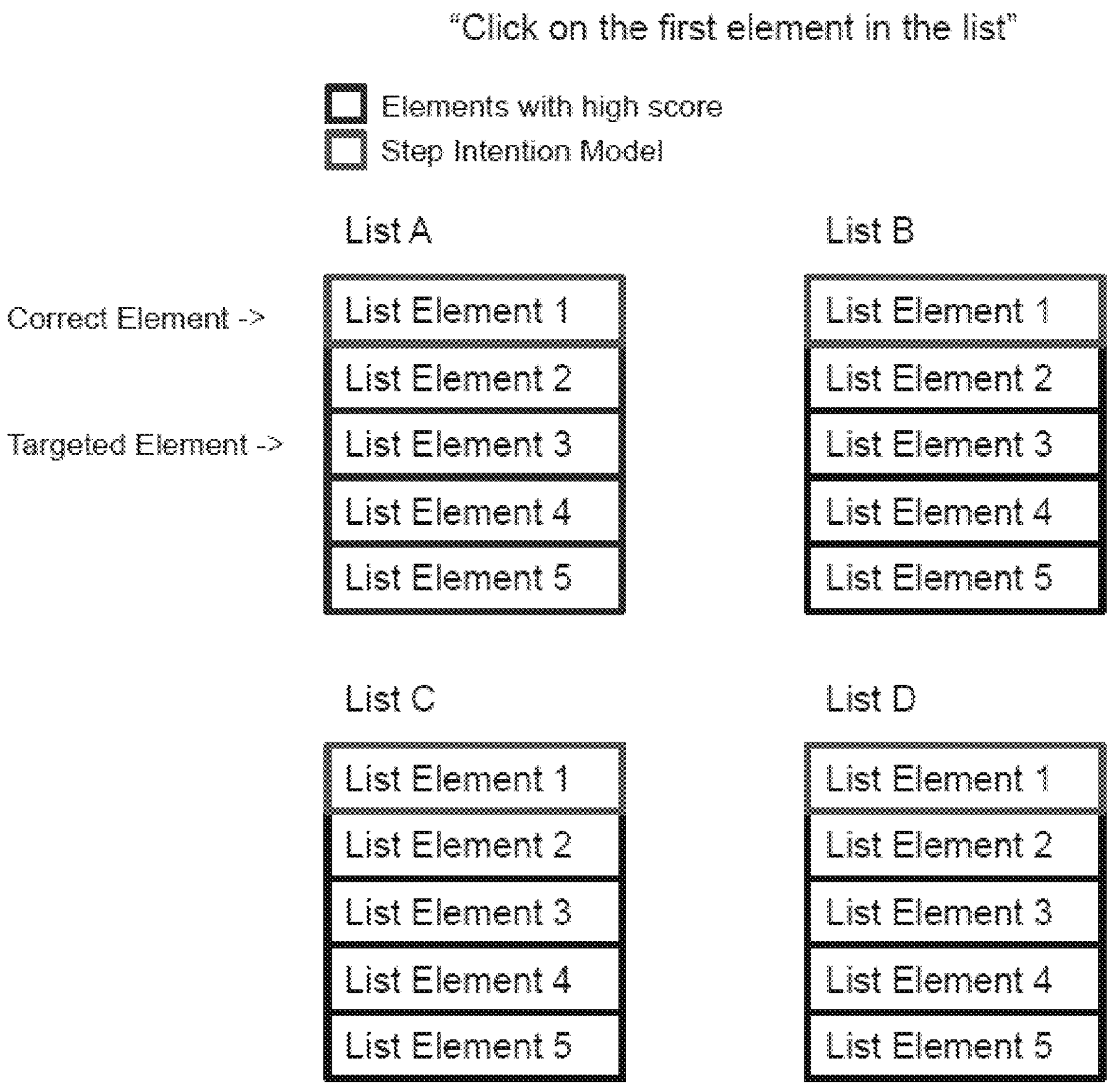
FIG. 15 is a schematic showing the use of test case step intention modeling to determine the correct target element for a test case.

During the development of embodiments of the technology provided herein, the technology was used to identify a target element by identifying the intent of a test case. See, e.g., FIG. 15. As described herein, a software test case consists of a sequence of actions and elements upon which those actions are performed. A written description of the test case step may also be included in the test case definition. An example of a test step description can be seen in FIG. 15 such as "click on the first element in the list." If a natural language test case description is included, this language can be used to build a step intention model. After elements have been scored, the highest scoring element is validated against the intention of the test case step. As seen in FIG. 15, the targeted element in the test case definition has moved its position in a menu list A from the first position to the third position. The application page also contains other menu lists represented as lists B, C, and D. The element scoring process could successfully identify the target element and would give a high score to elements surrounding it containing similar code attributes and position. However, when compared with the step intention model, the validation would fail. The step intention model would identify the first element in all menu lists A, B, C, and D with high scores. If this validation fails, the results from the step intention model are intersected with the results from the element scoring processes to redefine the target element. This process results in correctly selecting the first element in list A. The test case definition is then edited to store the new target element representation for subsequent test runs.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method, in a computer system having a processor, for testing an element of a web-based user interface that is a target element of a test case action, the method comprising:

the processor capturing a screenshot of the web-based user interface;

the processor identifying a plurality of elements of the web-based user interface utilizing at least computer vision applied to the screenshot;

the processor determining attribute values of each element among the identified plurality of elements, wherein determining attribute values includes evaluating one or more of an element visual render, an element text, an element code, and/or an element context;

the processor assigning a respective element definition to each element among the plurality of elements of the web-based user interface using machine learning and the attribute values, wherein:

the assigning includes generating, based on the attribute values, a generative model output from a generative machine learning model and a discriminative model output from a discriminative machine learning model, and producing the element definition by a combination of the generative model output and the discriminative model output;

each element definition is assigned to an associated element and each element definition uniquely identifies the associated element after a change in the web-based user interface and/or an attribute value of the associated element;

the processor producing element match scores of multiple elements among the plurality of elements by comparing element definitions of the multiple elements determined based on the screenshot to a target element definition determined prior to the change;

the processor identifying a particular element among the multiple elements having a highest element match score as the target element of the test case action; and the processor performing the test case action on the target element.

2. The method of claim 1, further comprising validating a result of performing the test case action on the target element.

3. The method of claim 2, wherein validating the result comprises producing a "test success" or "test failure" value.

4. The method of claim 3, wherein:

the identifying includes identifying the plurality of elements utilizing a neural net; and the method further includes training the neural net based on said "test success" or "test failure" value.

5. The method of claim 1, further comprising validating page loading prior to determining attribute values for the plurality of elements of said web-based user interface.

6. The method of claim 3, further comprising alerting a user of a failed test when validating the result comprises producing the "test failure" value.

7. The method of claim 1, further comprising determining a test case intent including the target element and the test case action.

8. The method of claim 7, wherein determining the test case intent includes performing natural language processing.

9. The method of claim 7, comprising comparing the particular element having the highest element match score and the target element.

10. The method of claim 1, wherein producing element match scores includes producing element match scores utilizing a neural net.

11. The method claim 1, wherein evaluating one or more of the element visual render, the element text, the element code, and/or the element context comprises element visual scoring, element language scoring, element code scoring, and/or element context scoring using a neural net.

12. The method of claim 1, wherein:

determining the attribute vlues includes evaluating element context by producing a linear combination of outputs of a generative model and a discriminative model.

13. The method of claim 1, wherein evaluating element context comprises evaluating relative location of the elements, element attributes weighted by stability scores, and/or high information elements.

14. The method of claim 1, wherein identifying the plurality of elements additionally includes identifying at least one element of the web-based user interface based on a document object model (DOM), XML file, or JSON file.

15. The method of claim 1, wherein producing the element definition by a combination of the generative model output and the discriminative model output comprises producing the element definition by a linear combination of the generative model output and the discriminative model output.

16. A computer program product for testing an element of a web-based user interface that is a target element of a test case action, the method comprising:

storage media;

instructions in the storage media for causing a computer system to perform operations, including:

capturing a screenshot of the web-based user interface;

the processor identifying a plurality of elements of the web-based user interface utilizing at least computer vision applied to the screenshot;

determining attribute values of each element among the identified plurality of elements, wherein determining attribute values includes evaluating one or more of an element visual render, an element text, an element code, and/or an element context;

assigning a respective element definition to each element among the plurality of elements of the web-based user interface using machine learning and the attribute values, wherein:

the assigning includes generating, based on the attribute values, a generative model output from a generative machine learning model and a discriminative model output from a discriminative machine learning model, and producing the element definition by a combination of the generative model output and the discriminative model output;

each element definition is assigned to an associated element and each element definition uniquely identifies the associated element after a change in the web-based user interface and/or an attribute value of the associated element;

producing element match scores of multiple elements among the plurality of elements by comparing element definitions of the multiple elements determined based on the screenshot to a target element definition determined prior to the change;

identifying a particular element among the multiple elements having a highest element match score as the target element of the test case action; and performing the test case action on the target element.

17. The computer program product of claim 16, wherein:

the identifying includes identifying the plurality of elements utilizing a neural net; and wherein the program code further causes the processor to perform training the neural net based on a "test success" or "test failure" value determined based on performing the test case action.

18. The computer program product of claim 16, wherein:

determining the attribute values includes evaluating element context by producing a linear combination of outputs of generative and discriminative machine learning models.

19. The computer program product of claim 16, wherein producing the element definition by a combination of the generative model output and the discriminative model output comprises producing the element definition by a linear combination of the generative model output and the discriminative model output.

20. A computer system for testing an element of a web-based user interface that is a target element of a test case action, the computer system comprising:

a processor;

storage media communicatively coupled to the processor; and instructions in the storage media and executable by the processor to cause the computer system to perform operations, including:

capturing a screenshot of the web-based user interface;

the processor identifying a plurality of elements of the web-based user interface utilizing at least computer vision applied to the screenshot;

determining attribute values of each element among the identified plurality of elements, wherein determining attribute values includes evaluating one or more of an element visual render, an element text, an element code, and/or an element context;

assigning a respective element definition to each element among the plurality of elements of the web-based user interface using machine learning and the attribute values, wherein:

the assigning includes generating, based on the attribute values, a generative model output from a generative machine learning model and a discriminative model output from a discriminative machine learning model, and producing the element definition by a combination of the generative model output and the discriminative model output;

each element definition is assigned to an associated element and each element definition uniquely identifies the associated element after a change in the web-based user interface and/or an attribute value of the associated element;

producing element match scores of multiple elements among the plurality of elements by comparing element definitions of the multiple elements determined based on the screenshot to a target element definition determined prior to the change;

identifying a particular element among the multiple elements having a highest element match score as the target element of the test case action; and performing the test case action on the target element.

21. The data processing system of claim 20, wherein:

the identifying includes identifying the plurality of elements utilizing a neural net; and wherein the program code further causes the processor to perform training the neural net based on a "test success" or "test failure" value determined based on performing the test case action.

22. The computer system of claim 20, wherein:

determining the attribute values includes evaluating element context by producing a linear combination of outputs of generative and discriminative machine learning models.

23. The computer system of claim 20, wherein producing the element definition by a combination of the generative model output and the discriminative model output comprises producing the element definition by a linear combination of the generative model output and the discriminative model output.

* * * * *